Figure 1:
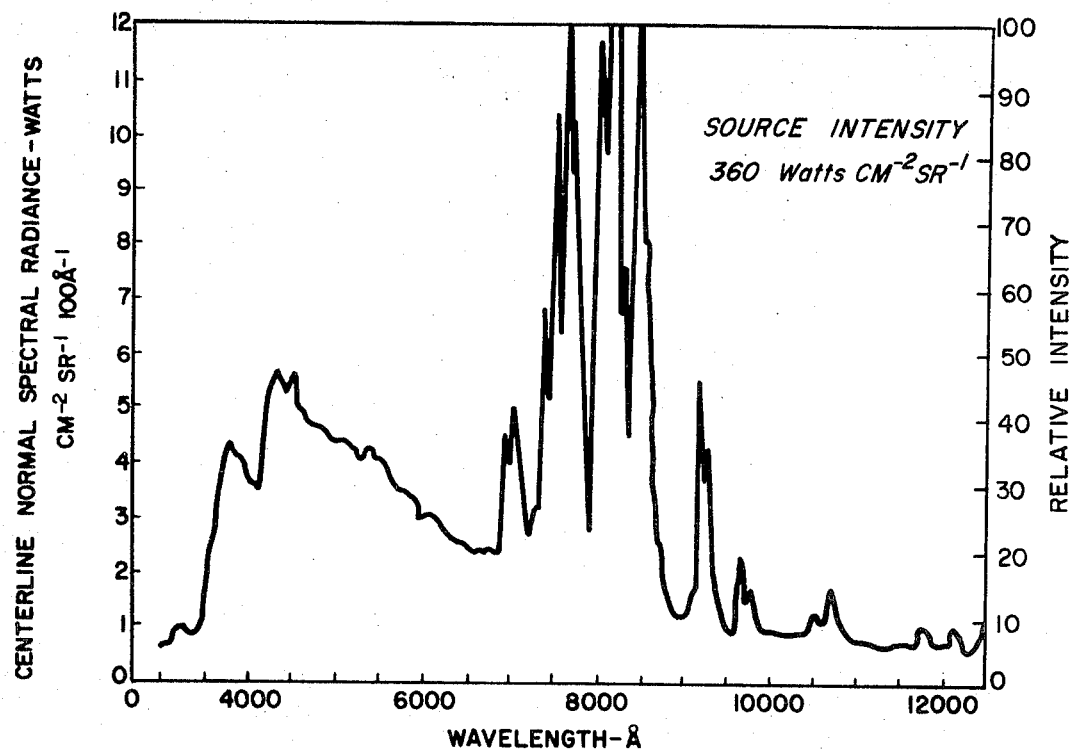

United States Patent [15] 3,650,669
Osborn et al. [45] Mar. 21, 1972

[54] TREATMENT OF MONOMERIC AND POLYMERIC SYSTEMS WITH HIGH INTENSITY PREDOMINANTLY CONTINUUM LIGHT RADIATION

[72] Inventors: Claiborn Lee Osborn; David John Trecker, both of So. Charleston, W. Va.

[73] Assignee: Union Carbide Corporation, New York, N.Y.

[22] Filed: Sept. 2, 1970

[21] Appl. No.: 69,041

Related U.S. Application Data

[63] Continuation-in-part of Ser. No. 794,752, Jan. 28, 1969, abandoned, and a continuation-in-part of Ser. No. 838,460, July 2, 1969, abandoned.

[52] U.S. Cl. ....................8/115.5, 117/93.1, 117/143 A, 117/155 UA, 117/232, 204/159.12, 204/159.13, 204/159.14, 204/159.15, 204/159.16, 204/159.17, 204/159.19, 204/159.2, 204/159.22, 204/159.23, 204/159.24, 204/160.1, 260/17 R, 260/37 SB, 260/41 R, 260/41 B, 260/75 TN, 260/75 UA, 260/77.5 AT, 260/86.7, 260/87.3, 260/88.2 D, 260/115.5, 260/230, 260/824, 260/825, 260/827, 260/859, 260/871, 260/885
[51] Int. Cl. ......................B01j 1/00, C08d 1/00, C08f 1/00
[58] Field of Search.............204/161, 162, 164, 168, 159.14, 204/159.22, 159.2, 170; 8/115.5

[56] References Cited

UNITED STATES PATENTS

| | | | |
|---|---|---|---|
| 3,332,870 | 7/1967 | Orbach et al. | 204/168 |
| 3,328,276 | 6/1967 | Schmidt et al. | 204/170 |
| 3,405,045 | 10/1968 | Hoskins | 204/159.22 |

OTHER PUBLICATIONS

Vurzel et al., Plasma Chemical Technology, The Future of The Chemical Industry, Industrial and Engineering Chemistry, Vol. 62, No. 6, June, 1970, pp. 8–22

*Primary Examiner*—Murray Tillman
*Assistant Examiner*—Richard B. Turer
*Attorney*—Paul A. Rose, Aldo John Cozzi and Francis M. Fazio

[57] ABSTRACT

High intensity predominantly continuum light radiation having an intensity of at least about 350 watts per square centimeter steradian is used to polymerize monomers and to crosslink polymers. A convenient source of this high intensity predominantly continuum light radiation is a swirl-flow plasma arc radiation source. The polymers can be crosslinked in the form of films, fibers, molded or extruded shaped articles, coatings, laminated articles, and the like. The process produces finished articles having known commercial utility.

33 Claims, 4 Drawing Figures

INVENTORS
CLAIBORN L. OSBORN
DAVID J. TRECKER
BY F. M. Fazio
ATTORNEY

TREATMENT OF MONOMERIC AND POLYMERIC SYSTEMS WITH HIGH INTENSITY PREDOMINANTLY CONTINUUM LIGHT RADIATION

This application is a continuation-in-part of Ser. No. 794,752, filed on Jan. 28, 1969, now abandoned and Ser. No. 838,460, filed on July 2, 1969, and now abandoned.

BACKGROUND OF THE INVENTION

This invention relates to the manufacture of cross-linked polymers. More particularly it pertains to the use of an artificial source of high intensity predominantly continuum light radiation having a source intensity of at least about 350 watts per square centimeter steradian for polymerizing monomers to produce cross-linked polymers and for curing or cross-linking performed polymers and polymer-containing compositions; and to the finished articles produced therewith.

The use of electron beam radiation generated with a nuclear reactor, Van de Graaff accelerator, linear accelerator, radioactive elements such as cobalt 60 or strontium 90, and the use of ultraviolet light generated with a mercury lamp for the polymerization of monomers and the cross-linking or curing of polymers is well known. It is also known that the reactions can be carried out with the presence of free radical initiators in the reactants, or with the presence of photosensitizers or corsslinkers. This knowledge is common knowledge to those of ordinary, average skill in the art and will not be repeated here since it can be found in a multitude of published texts, technical journals and patents.

The use of radioactive materials and electron beam accelerators, while efficient, suffers many deficiencies. Chief of these are the high construction costs involved to protect the surrounding areas from the radioactive emissions and the expensive precautions that must be taken to insure that the workers do not become overexposed. Further, in many instances this form of radiation has a degradative effect on the material being treated, for example, cellulosic materials; also, electron beam radiation is not as efficient since most of the high energy electrons pass through the coating film and are absorbed by the substrate rather than being fully utilized to cure the film.

The use of low to medium pressure mercury lamps to generate ultraviolet light is a known alternative. The largest such mercury lamp of commercial utility is generally about five feet long having a diameter of about one to two inches with an electrical input of about 20 kilowatts generating a typical low intensity ultraviolet light line structure (source intensity is generally no greater than about 20 kilowatts per square foot of source projected area). A long period of time is generally needed for completion of a reaction when a material is exposed to the low intensity ultraviolet radiation generated from a mercury lamp.

STATEMENT OF THE INVENTION

It has been found that the high intensity predominantly continuum light radiation from, for example, a swirl-flow plasma arc radiation source causes many monomers to polymerize quite rapidly, in some instances even in the absence of catalysts or photosensitizers. The same effect was observed in the curing or cross-linking of polymer compositions. By comparison, low intensity ultraviolet line radiation from mercury lamps was considerably slower and in some instances completely ineffective. Generally, high intensity predominantly continuum light radiation was effective within seconds, or at the most several minutes. Whereas, low intensity ultraviolet light radiation required appreciably longer periods of time to achieve the same effect. The examples herein show many instances in which cross-linking was achieved in seconds with high intensity predominantly continuum light radiation from a swirl-flow plasma arc radiation source versus minutes or even hours with low intensity ultraviolet line radiation from conventional mercury arc sources. The light radiation from a swirl-flow plasma arc radiation source is high intensity predominantly continuum light radiation.

It was discovered that a source of light radiation emitting high intensity predominantly continuum light radiation containing ultraviolet, visible and infrared radiation can be used to polymerize monomers and to cross-link polymer compositions. By means of proper light filters, one can selectively screen out a portion of the light radiation emitted permitting only that wavelength portion desired to reach the material that is being treated.

The term "high intensity predominantly continuum light radiation" means continuum radiation with a source intensity of at least 350 watts per square centimeter steradian when integrated throughout the entire spectral range of said continuum light radiation (about 1,000 kilowatts per square foot of source projected area) having only a minor part of the energy in peaks of bandwidths a positive amount up to 100 Angstrom units, with less than about 30 per cent of the light radiated having wavelengths shorter than 4,000 Angstrom units and at least about 70 per cent of the light energy radiated having wavelengths longer than 4,000 Angstrom units. This type of high intensity continuum light radiation is illustrated by the curves shown in FIGS. 1 to 3. These curves illustrate the high intensity predominantly continuum nature of the light radiation over the range of source intensity of from about 350 watts per square centimeter steradian to about 5,000 watts per square centimeter steradian. As is evident from the curves of FIGS. 1 to 3 the light radiated is predominantly continuum light with very little light emitted as line or peak radiation (band widths less than 100 Angstrom units). It is also evident from these Figures that less than about 30 per cent of the light radiated having wavelengths shorter than 4,000 Angstroms and that at least about 70 per cent of the radiated light having wavelengths longer than 4,000 Angstrom units.

This light radiation is derived from an artificial source that generates high intensity predominantly continuum light radiation with a source intensity of at least about 350 watts per square centimeter steradian, when integrated throughout the entire spectral range of said continuum light radiation as abbreviated by the term: watts cm.$^{-2}$ sr.$^{-1}$; said high intensity predominantly continuum artificial light radiation has at least about 70 per cent of the light radiated at a wavelength longer than 4,000 Angstroms and a positive amount up to about 30 per cent of the light radiated having a wavelength shorter than 4,000 Angstroms, generally about 80 per cent of the light radiated has a wavelength longer than 4,000 Angstroms and less than about 20 per cent of the light radiated has a wavelength shorter than 4,000 Angstroms, and a source intensity that can vary from about 350 watts (about 1,000 kilowatts per square foot of source projected area) to about 5,000 watts (about 15,000 kilowatts per square foot of source projected area) or more per square centimeter steradian. A convenient source of high intensity predominantly continuum light radiation is a swirl-flow plasma arc light radiation apparatus. The equipment for generating high intensity predominantly continuum light radiation by this means is known and available; many different forms thereof are described in the literature. A highly efficient apparatus for obtaining high intensity predominantly continuum light radiation is the swirl-flow plasma arc radiation source described in U.S. Pat. No. 3,364,387. The apparatus or equipment necessary for generating the light radiation is not the subject of this invention and any source or apparatus capable of generating high intensity predominantly continuum light radiation can be used.

While any artificial source of generating high intensity predominantly continuum light radiation can be used, as previously indicated the swirl-flow plasma arc radiation apparatus is most convenient. Hence, this source will be used in this application as illustrative of a means for obtaining the high intensity predominantly continuum light radiation. Any apparatus that operates according to the known principles of the swirl-flow plasma arc radiation source can be used to produce the high intensity predominantly continuum light radiation useful in the processes of this invention. These apparatuses are often known by other terms but those skilled in this art recognize that they emit high intensity predominantly continuum light radiation. The source of radiation in a 50 kilowatt swirl-flow plasma arc radiation source is an arc only about four inches long enclosed in a quartz envelope about 1.5 inches in diameter. This lamp can be readily removed and refurbished and has an acceptable long lifetime. Further, a swirl-flow plasma arc radiation apparatus having a 250-kilowatt rating would be only about two or three times as large as a 50-kilowatt source. Another advantage is the absence of a need for expensive radiation shielding. Precautions required for the artificial light sources include those needed to protect one's eyes from the intense visible light and from the ultraviolet light present to prevent inadvertent sunburn effect on the body.

Figure 3:
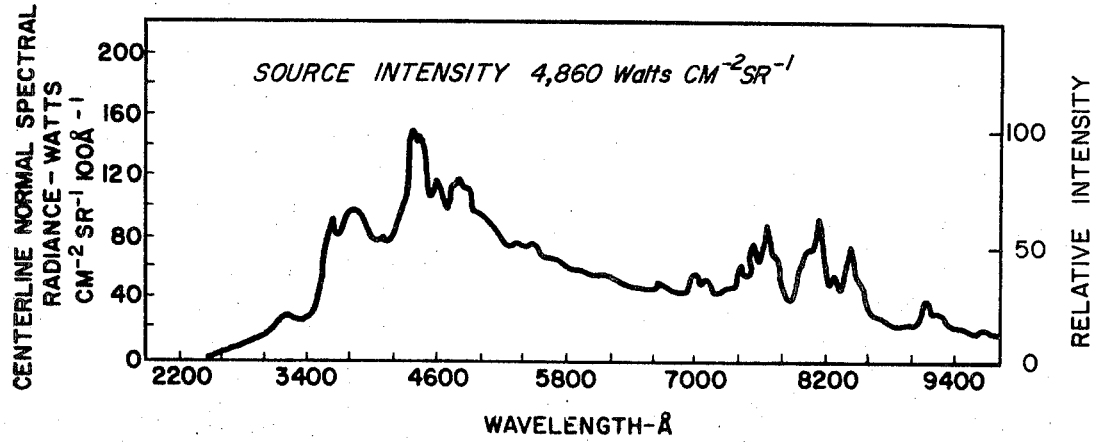
Figure 2:
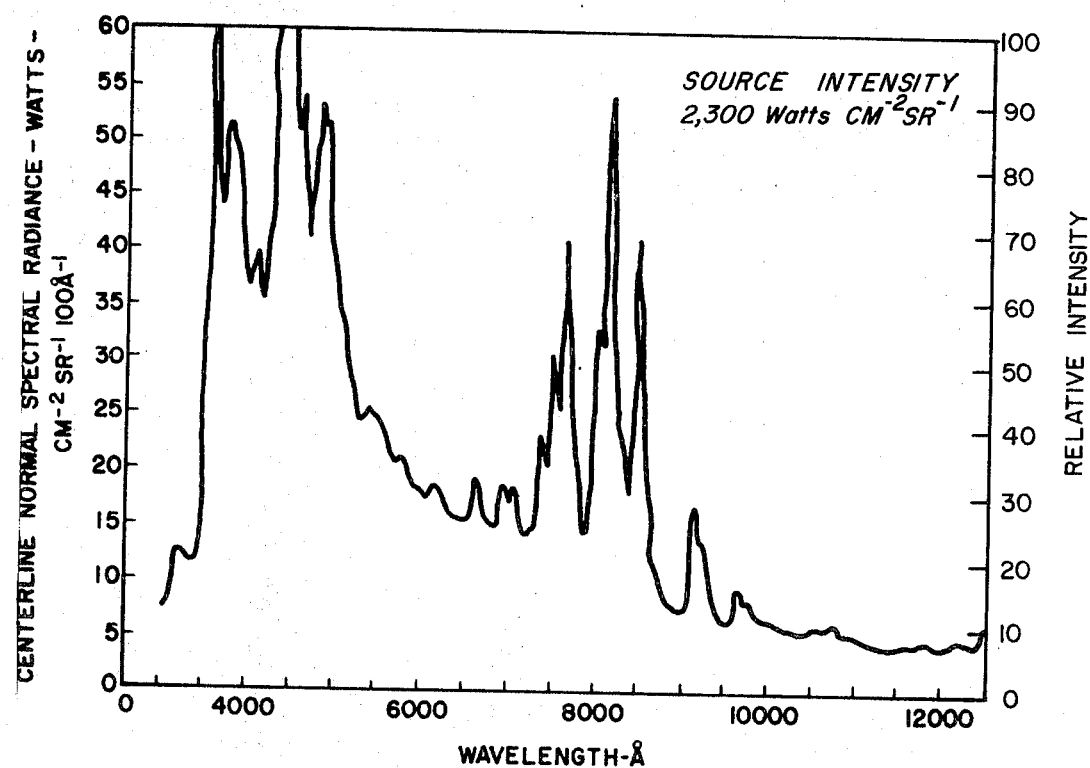

It is to be noted that in the spectra of FIGS. 1 to 3 there is a continuum of radiation throughout the entire spectral range shown. This type of continuum radiation in the ultraviolet range has not heretofore been obtainable from the conventional commercially mercury arcs or lamps generally available for generating ultraviolet light. The previously known means for generating ultraviolet light produced light that shows a line or peak spectrum in the ultraviolet range, as exemplified by FIG. 4; it is not a continuum spectrum in the ultraviolet range. In a line spectrum the major portion of useable ultraviolet light is that portion at which the line or band in the spectrum forms a peak; in order for such energy to be useful the material or composition that is to be treated with ultraviolet radiation must be capable of absorbing at that particular wavelength range at which the peak appears. In the event the material or composition does not have the ability to absorb at that particular wavelength range there is little or no absorption or reaction. Thus, in the event the material or composition to be treated absorbs at a particular wavelength range in one of the valleys of the spectral curve there will be little or no reaction since there is little or no ultraviolet energy to adequately excite the system. With a high intensity predominantly continuum radiation, as is shown by FIGS. 1 to 3, there is a high intensity continuum radiation of ultraviolet energy across the entire ultraviolet wavelength range of the spectrum shown and there is generally sufficient ultraviolet energy generated at all useful ultraviolet wavelengths to enable one to carry out reactions responsive to ultraviolet radiation without the problem of selecting compounds that will absorb at the peak wavelength bands only. With the high intensity continuum radiation now discovered one does not have the problem of being unable to react materials or compositions that absorb in the valley areas only since for all intents and purposes such valleys do not exist in high intensity continuum radiation, the high intensity radiated light energy is essentially a continuum, it is not in peak bands.

FIG. 1 is the light radiation curve from an 18 kilowatt argon swirl-flow plasma arc radiation source. The measured source intensity of the light was 360 watts per square centimeter steradian; about eight per cent of the light had a wavelength shorter than 4,000 Angstrom units and about 92 per cent of the light had a wavelength longer than 4,000 Angstrom units.

FIG. 2 is the light radiation from a 60 kilowatt argon swirl-flow plasma arc radiation source. The measured source intensity was about 2,300 watts per square centimeter steradian; about 10 per cent of the light had a wavelength shorter than 4,000 Angstrom units and about 90 per cent of the light had a wavelength longer than 4,000 Angstrom units.

FIG. 3 is the light radiation from a 71 kilowatt argon swirl-flow plasma arc radiation source. The measured source intensity was about 4,860 watts per square centimeter steradian; about 12 per cent of the light had a wavelength shorter than 4,000 Angstrom units and about 88 per cent of the light had a wavelength longer than 4,000 Angstrom units.

Figure 4:
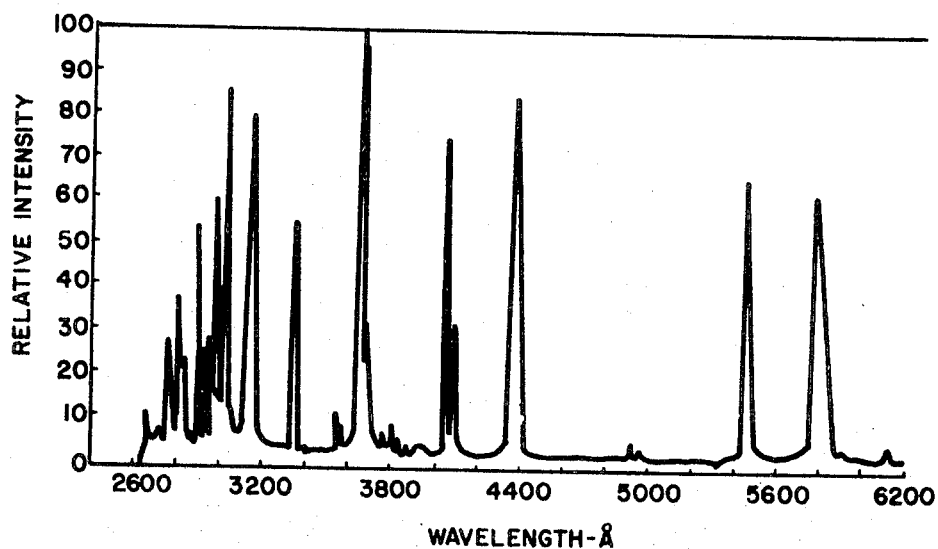

High intensity predominantly continuum light radiation as shown by FIGS. 1 to 3 is to be distinguished from low intensity ultraviolet radiation generated by commercially available low, medium and high pressure mercury arc ultraviolet lamps. These mercury arc lamps produce light emission which is primarily line or peak rather than continuum light. FIG. 4 is a typical curve for the light radiation from a mercury arc lamp. As shown in FIG. 4, a major part of the light appears in bands narrower than 100 Angstrom units, and much less than 70 per cent is above 4,000 Angstrom units.

As is known, high intensity predominantly continuum light radiation from a swirl-flow plasma arc radiation source is emitted from an arc generated between a pair of electrodes that are lined up axially and encased in a quartz cylinder. In an embodiment a pair of concentric quartz cylinders between which cooling water or gas flows is used. A rare gas, such as argon, krypton, neon or xenon, introduced into the inner cylinder tangentially through inlets located at one end of the inner cylinder, creates a swirling flow or vortex which restricts the arc to a small diameter. An electrical potential applied across the electrodes causes a high density current to flow through the gas to generate a plasma composed of electrons, positively charged ions and neutral atoms. A plasma generated in the above gases produces high intensity predominantly continuum light radiation with diffuse maxima in the region of from about 3,500 to about 6,000 Angstroms. The radiation source can also be used with reflectors or refractive optical systems to direct the high intensity predominantly continuum light radiation emanating from the arc to a particular point or direction or geometrical area.

Among the monomers that can be polymerized by the process of this invention are the ethylenically unsaturated monomers containing at least one polymerizable ethylenically unsaturated group of the structure

The process can be used to polymerize a single monomer or a mixture of two or more monomers throughout the entire concentration ranges possible, selected to suit the scientist's purpose. The monomers can be aliphatic, aromatic, cycloaliphatic, or any variant thereof. Illustrative thereof one can mention the olefinic hydrocarbons containing up to about 18 carbon atoms such as ethylene, propylene, butylenes, pentenes, hexenes, dodecene, heptenes, octenes, styrene, 4-methylstyrene, alpha methylstyrene, cyclo-pentadiene, dicyclopentadiene, butadiene, hexadiene, bicyclo-[2.2.1]hept-2-ene, bicyclo[2.2.1]hept-2,5-diene, methylbicyclo[2.2.1]hept-2-ene, cyclohexene, 4-methyl-1-pentene, 5-methyl-1-hexene, and the like; acrylic acid and its derivatives, such as acrylonitrile, methacrylonitrile, acrylamide, methacrylamide, methacrylic acid, methyl methacrylate, ethyl methacrylate, ethyl acrylate, 1-ethylhexyl acrylate, butoxyethoxyethyl acrylate, neopentyl glycol diacrylate, and the like; the vinyl halides such as vinyl chloride, vinylidene chloride, and the like; the vinyl esters such as vinyl acetate, vinyl butyrate, vinyl benzoate, and the like; the vinyl ketones such as isopropenyl methyl ketone, vinyl phenyl ketone, vinyl methyl ketone, alphachlorovinyl methyl ketone, and the like; the vinyl thioethers such as vinyl ethyl sulfide, vinyl p-tolyl sulfide, divinyl sulfide, and the like. Other monomers or monomer mixtures which are capable of polymerization by the process of this invention are divinyl sulfone, vinyl ethyl sulfone, vinyl ethyl sulfoxide, vinyl sulfonic acid, sodium vinyl sulfonate, vinyl fulsonamide, vinyl pyridine, N-vinyl pyrolidone, N-vinyl carbazole, and the like. Other suitable vinyl monomers are readily apparent to the skilled polymer chemist; this listing is illustrative only and not all-inclusive. The preferred monomers include styrene and its derivative and the acrylyl and methacrylyl compounds and derivatives thereof.

The monomers are polymerized by exposing them either alone or in admixture with known free radical catalysts or photosensitizers or conventional additives, as hereinafter shown useful for cross-linking polymers, to the high intensity predominantly continuum light radiation, such as that emanating from a swirl-flow plasma arc radiation source. The process can be carried out continuously by passing the reaction mixture through a transparent conduit or other means positioned in the radiation area, or batchwise by placing the reactants in a suitable container and exposing the container and its contents to the high intensity predominantly continuum light radiation for a prolonged period of time. One can also coat a substrate, such as metal, wood, glass, composition board, etc., with the monomers, or impregnate or coat a fibrous material, such as paper, textile, fiber etc., with the monomers and expose the treated material to the high intensity predominantly continuum light radiation. The temperature can vary from about 0° C. to about 250° C. or higher, preferably from about 20° C. to about 100° C., and the pressure can be subatmospheric, atmospheric, or superatmospheric to about 10 atmospheres or more (limited solely by equipment properties). In some instances catalysts are not needed, thus producing polymers of higher purity, whereas, in other instances highly reactive catalysts are necessary. The exposure to high intensity predominantly continuum light radiation can be carried out in air or in an inert gas atmosphere.

The process of this invention can also be used to cross-link polymers. The polymers that can be cross-linked include the crosslinkable synthetic organic polymers such as the polyolefins and modified polyolefins, the vinyl polymers, the polyethers, the polyesters, the polylactones, the polyamides, the polyurethanes, the polyamides, the polyureas, the polysiloxanes, the polysulfides, the polysulfones, the polyformaldehydes, the phenol-formaldehyde polymers, the natural and modified natural polymers, the heterocyclic polymers, and the like.

The term polymer as used herein includes the homopolymers and copolymers. The useful crosslinkable polymers include the olefin polymers and copolymers such as polyethylene, polypropylene, polyisobutene, polybutene, poly(ethylene/propylene), poly(ethylene/butene), poly(ethylene/butadiene), poly(ethylene/norbornadiene), poly(ethylene/propylene/orbornadiene), poly(ethylene/-propylene/5-methylene/bicyclo[2.2.1]hept-2-ene), poly(ethylene/propylene/-ethylidene-bicyclo[2.2.1]hept-2-ene), poly(ethylene/vinyl acetate), poly(ethylene/vinyl chloride), poly(ethylene/ethyl acrylate), poly(ethylene/acrylonitrile) poly(ethylene/acrylic acid), poly(ethylene/styrene), poly(ethylene/vinyl ethyl ether), poly(ethylene/vinyl methyl ketone), polybutadiene, polyisoprene, polychloroprene, polycyclopentadiene, poly-1,5-hexadiene, poly(butadiene/isoprene), poly(butadiene/vinyl chloride), poly(butadiene/dimethyl butadiene), poly(butadiene/chloroprene), poly(isoprene/isobutylene), poly(butadiene/isobutylene), poly(butadiene/styrene), poly(butadiene/acrylonitrile), poly(butadiene/styrene/acrylonitrile), poly(butadiene/methyl methacrylate), poly(butadiene/butyl acrylate), poly(butadiene/vinyl chloride), poly(isoprene/styrene), poly(isoprene/2-vinyl pyridine), and the like. The olefin polymers are well known and any such polymer can be used. Also suitable are the vinyl and vinylidene polymers such as poly(vinyl chloride), poly(vinyl bromide), poly(vinylidene chloride), poly(vinyl acetate), poly(vinyl methyl ether), poly(vinyl butyl ether), poly(vinyl methyl ketone), poly(vinyl alcohol), poly(allyl alcohol), polyindene, poly(vinylpyridine), poly(vinylpyrrolidone), poly(vinyl butyral), poly(vinyl chloride), poly(vinyl sulfonic acid), polystyrene, poly($\alpha$-methylstyrene), poly(4-chlorostyrene), poly(4-vinyl biphenyl), poly(9-vinyl-anthracene), poly(N-vinyl-carbazole), poly(N-vinyl-1,2,-4-triazole), and the like. Further suitable are the acrylic polymers such as poly(acrylic acid), poly(methyl acrylate), poly(ethyl acrylate), polyacrylonitrile, polyacrylamide, polyacrolein, poly(methacrylic acid), poly(methyl methacrylate), poly(ethyl methacrylate), polymethacrylonitrile, poly(N,N-dimethyl acrylamide), poly(methacrylamide), poly(9-acrylylcarbazole), poly($\alpha$-methacrolein), poly(diacrylalmethane), poly(acrylic anhydride), poly(methacrylic anhydride), and the like. In addition, the polyesters and polyamides such as polycaprolactone, poly(caprolactone/vinyl chloride), poly(ethylene glycol terephthalate), poly(hexamethylene suc-cinate), poly(hexamethylene maleate), poly(hexamethylene carbonate), poly(caprolactam), poly(hexamethylene adipamide), and the like, are useful. The polyethers such as poly(glutardialdehyde), polyethylene oxide, polypropylene oxide, poly(tetrahydrofuran), polycyclohexene oxide, copolymers of ethylene oxide and propylene oxide with starters containing reactive hydrogen atoms such as the mixed copolymer using ethylene glycol, glycerol, sucrose, etc., as the starter. Also suitable are the known polyureas and polyurethanes as described in "Polyurethanes: Chemistry and Technology," Volumes I and II, Saunders and Frisch, published by Interscience Publishers, as well as the natural and modified natural polymers such as gutta percha, cellulose, methyl cellulose, starch, silk, wool, and the like, and the siloxane polymers and copolymers. The polysulfides and polysulfones such as poly(thiocarboxyl fluoride), poly(ethylene dichloride-co-sodium tetrasulfide), poly(ethylene sulfide), poly(ethylene sulfone), poly(styrene sulfone), poly(1-pentyne sulfone), poly(butadiene sulfone), poly(isoprene sulfone), and the like. The formaldehyde polymers such as polyformaldehyde, formaldehyde resins such as phenolformaldehyde, melamine-formaldehyde, urea-formaldehyde, aniline-formaldehyde and acetone-formaldehyde, and the like. The heterocyclic polymers such as poly(benzimidazoles), poly(alkylene-5,5'-dibenzimidazoles), poly(arylene5,5'-benzimidazoles), poly(pyromellitimides), poly(benzoxazoles), poly(oxadiazoles), poly(dithiazoles), poly(benzothiazoles), poly(piperazines), poly(quinoxalines), and the like.

The polymers can be cross-linked by the process of this invention by irradiating the polymer, a solution thereof in an inert solvent, or a suspension, dispersion or emulsion thereof with high intensity predominantly continuum light radiation. A particularly valuable use is the curing and cross-linking of 100 per cent solids coating compositions or compositions wherein a polyester, a polyurethane, an acrylic polymer, a styrene polymer, an olefin polymer, a vinyl polymer, a siloxane polymer, and the like, is compounded with reactive monomers to form coating compositions essentially free of non-reactive volatile solvents. Many of these coating compositions are known in the art, reference herein being made to U.S. Pat. No. 3,392,176. However, this invention is not restricted to 100 per cent solids coating compositions; it can be used to cure any crosslinkable coating composition or polymer, whether or not a vaporizable solvent is present.

Of particular utility are the 100 per cent solids coating compositions produced with certain organic polymers containing the norbornenyl group, particularly polyesters containing the norbornenyl group, and certain high boiling acrylyl esters. These liquid coating compositions have been cured by the process of this invention to solid film coatings in seconds. Generally, the coating compositions contain from about five to about 95 per cent by weight, preferably from about 40 to about 70 per cent by weight of the polyester or polymer containing the norbornenyl group and from about 95 to five per cent by weight, preferably from about 20 to about 60 per cent by weight of one or more high boiling acrylyl esters. Most preferably the acrylyl ester concentration is from about 25 to 55 per cent by weight of the composition. The compositions can contain pigments, fillers, photosensitizers, crosslinkers, and the like, all of which are known to be useful in this art.

The polyesters containing the norbornenyl group are produced by the known procedures using as the norbornene compound a norbornene dicarboxylic acid, its anhydride, ester, ester chloride or ester dichloride of the formula (I)
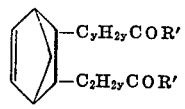

or a dihydroxyl norbornene of the formula
(II)
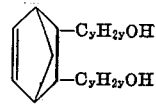

or a norbornene hydroxyl acid, ester, or ester chloride of the formula (III)

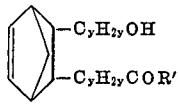

in which y has a value of 0 to about 5 and R' is hydroxyl or alkoxyl having from one to about three carbon atoms or chlorine.

Polyesters can be produced by the self-condensation of the norbornene hydroxyl acids (III), alone or with other hydroxyl acid compounds. Polyesters can also be produced by the condensation of a mixture of the norbornene dicarboxylic acid compounds (I) with dihydroxyl norbornenes (II). In addition the polyesters can be produced by the reaction of the norbornene dicarboxylic acid compounds (I) with other aliphatic diols, alone or in admixture with other known dicarboxylic acids or esters. Further, the polyesters can be produced by the reaction of the dihydroxyl norbornenes (II) with other known dicarboxylic acids, either alone or in admixture with other known aliphatic diols. These procedures are known in the art.

In a typical method for the production of polyesters, the calculated amounts of carboxylic acid compounds, hydroxyl compounds and catalyst are charged to a reactor and heated in an inert atmosphere at a temperature below the decomposition temperature of the initial reactants. This is preferably from about 150°C. to about 250°C. It is conventional to use an excess of the least expensive compound, which excess can readily be determined since the reaction between the hydroxyl group and the carboxyl group proceeds in a stoichiometric ratio to form the ester group. If desired the pressure can be reduced to remove low boiling components and to complete the polycondensation reaction. The total esterification time is known to vary since it is dependent upon such variables as the catalyst, starting materials, pressure, temperature, size of batch, etc. The catalyst is generally present at a concentration of from about 0.001 per cent to about one per cent, preferably from about 0.005 per cent to about 0.3 per cent, based on the weight of the carboxylic acids charged. Among the known polyesterification catalysts one can mention antimony oxide, zinc acetate, manganese acetate, cobaltous acetate, zinc succinate, zinc borate, magnesium methoxide, sodium methoxide, barium oxide, cadmium formate, litharge, dibutyltin oxide, tetraisopropyl titanium silicate, tetrabutyl titanate, and the like.

Illustrative of conventional diols useful for the production of the polyesters are the aliphatic diols represented by the general formula $HOC_nH_{2n}OH$ in which n is an integer of from two to about 10, such as ethylene glycol, propylene glycol, trimethylene glycol, neopentylene glycol, pentamethylene glycol, hexamethylene glycol, decamethylene glycol, and the like. Also suitable are 1,4-cyclohexanedimethanol, diethylene glycol, p-xylylene glycol, 4-hydroxybenzyl alcohol, 2,2-dimethyl-3-hydroxypropyl 2,2-dimethyl-3-hydroxypropionate and the like. It is known that any diol of an aliphatic nature, whether or not it contains aromatic nuclei can be used in the production of polyesters. Thus, the term aliphatic diols includes all those diols of an aliphatic nature which are known in the art to be suitable.

The use of the norbornenyl acid chlorides in producing polyesters is advantageous since lower temperatures can be used in the condensation reaction. Thus, polyesters can be produced by the condensation of a norbornene dicarboxylic acid chloride (I) with dihydroxyl norbornenes (II). In addition the polyesters can be produced by the reaction of the norbornene dicarboxylic acid chloride (I) with other aliphatic diols, alone or in admixture with other known dicarboxylic acid chlorides. Further, the polyesters can be produced by the reaction of the dihydroxyl norbornenes (II) with other known dicarboxylic acid chlorides, either alone or in admixture with other known aliphatic diols.

A typical method for the production of polyesters from dicarboxylic acid chlorides and hydroxyl compounds combines approximately equivalent quantities of each in a reaction medium or solvent containing an acid-binding agent. The esterification is accomplished by heating the mixture to an elevated temperature. Since the reaction takes place under very mild conditions especially high temperatures are not necessary, 65–150°C., for example, being the preferred range of reaction temperatures.

The reaction medium may be a diluent or solvent; it is preferably that at least the starting materials be dissolved at the reaction temperature. Suitable as a reaction medium or solvent are aliphatic and aromatic hydrocarbons such as cyclohexane, heptane, benzene, toluene, tetrahydronaphthalene or cumene, halogenated hydrocarbons such as, chloroform, tetrachloroethylene, monochlorobenzene, orthodichlorobenzene, trichlorobenzene, ethers such as diphenyl ether, diisopropyl ether, N,N-dialkyl amides such as dimethyl formamide, dimethyl acet amide and alkyl sulfoxides such as dimethyl sulfoxide and tetramethylene sulfoxide. The N,N-dialkyl amides are preferred owing to their catalytic effect and favorable solvent power.

As acid binding agents, there are suitable, for example, pyridine and its homologues, furthermore N,N-dialkyl anilines, especially, N,N-diethyl aniline, isoquinoline and other stable heterocyclic nitrogen bases. Aliphatic or cycloaliphatic tertiary amines can also be used, for example, triethylamine, diethylene triamine, N-methylpiperidine and N-butylpyrrolidine. Also nonbasic hydrogen halide acceptors may be used as acrylonitrile, alkyl or arylsufethyleneimide, and the like.

The conventional carboxylic acids useful for the production of the polyesters are well known to those skilled in the art. The most widely used is terephthalic acid and the dialkyl esters thereof, such as dimethyl terephthalate, in which the alkyl group contains from one to about five carbon atoms. Other known dicarboxylic acids or their esters include isophthalic acid, p,p'-diphenylcarboxylic acid, p,p'-dicarboxydiphenyl ethane, p,p'-dicarboxydiphenyl hexane, p,p'-dicarboxydiphenyl sulfide, p,p'-dicarboxydiphenyl ether, p,p'-dicarboxyphenoxy butane, 2,6-dinaphthalene dicarboxylic acid, and the like. These aromatic acids can be used alone or in admixture, and up to about 20 per cent by weight of the aromatic acid can be replaced by an aliphatic dicarboxylic acid or ester thereof, such as adipic acid, succinic acid, sebacic acid, dimethyl 1,20-eicosane dioate, and the like.

Illustrative of known hydroxy acids that can be used in the production of the polyesters one can mention 4-hydroxybenzoic acid, 4-hydroxybutyric acid, 10-hydroxydecanoic acid, 3-hydroxy2,2-dimethylpropionic acid, as well as the esters thereof.

Suitable norbornene compounds for the production of the polyesters include 5,6-dicarboxybicyclo[2.2.1]hept-2-ene and the anhydride thereof; the dimethyl, diethyl, dipropyl, diisopropyl, dibutyl, diisobutyl, ditertiarybutyl, and dipentyl esters of 5,6-dicarboxybicyclo[2.2.1]hept-2-ene; the dicarboxyalkylbicyclo[2.2.1]hept-2-enes such as 5,6-dicarboxymethylbicyclo[2.2.1]hept-2-ene, 5,6-di-(2-carboxyethyl)bicyclo[2.2.1]hept-2-ene, 5,6-di-(3-carboxypropyl)bicyclo[2.2.1]hept-2-ene, 5,6-di-(2-carboxypropyl) bicyclo[2.2.1]hept-2-ene, the 5,6-dicarboxybutylbicyclo[2.2.1]-hept-2-enes, 5-carboxyethyl-6-carboxypropylbicyclo[2.2.1]hept-2-ene, 5-carboxymethyl-6-carboxypentylbicyclo[2.2.1]hept-2-ene, 5-carboxy-6-carboxymethylbicyclo[2.2.1]hept-2-ene, the 5,6-dicarboxypentylbicyclo[2.2.1]hept-2-enes, 5,6-di(carboxy-2-ethylhexyl)bicyclo-[2.2.1]hept-2-ene, the 5,6-dicarboxydecylbicyclo[2.2.1]hept-2-enes; the alkyl esters of said 5,6-dicarboxyalkylbicyclo[2.2.1]hept-2-enes; 5,6-dihydroxybicyclo[2.2.1]hept-2-ene; the lower fatty acid esters such as the acetoxy, propionoxy, butyryloxy, pentanoyloxy esters of 5,6-dihydroxybicyclo[2.2.1]hept-2-ene; the 5,6-dihydroxyalkylbicyclo[2.2.1]hept-2-enes such as 5,6-dihydroxymethylbicyclo[2.2.1]-hept-2-ene, 5,5-dihydroxymethylbicyclo[2.2.1]hept-2-ene, 5,6-di-(2-hydroxyethyl)bicyclo[2.2.1]hept-2-ene, 5-hydroxy-6-hydroxethyl-bicyclo[2.2.1]hept-2-ene, 5-hydroxymethyl-6-hydroxybutyl-bicyclo-[2.2.1]hept-2-ene, the 5,6-dihydroxypropylbicyclo[2.2.1]hept-2-enes, the 5,6-dihydroxypentylbicyclo[2.2.1]hept-2-enes, the 5,6-dihydroxybutylbicyclo[2.2.1]hept-2-enes, the 5,6-dihydroxyisopropylbicyclo[2.2.1]hept-2-enes; the lower fatty acid esters of said 5,6-dihydroxyalkylbicyclo[2.2.1]hept-2-enes; 5-hydroxy-6-carboxybicyclo[2.2.1]hept-2-ene; the lower mono- and di-esters of said 5-hydroxy-6-carboxybicyclo[2.2.1]hept-2-ene such as 5-carboxy-6-acetoxybicyclo[2.2.1]hept-2-ene, 5-carboxy-6-propionoxybicyclo-[2.2.1]hept-2-ene, 5-carboxy-6-butyryloxybicyclo[2.2.1]hept-2-ene, 5-acetoxy-6-carbomethoxybicyclo[2.2.1]hept-2-ene, 5-acetoxy-6-carbopentoxybicyclo[2.2.1]hept-2-ene, 5-pentanoyloxy-6-carbomethoxybicyclo[2.2.1]hept-2-ene, 4-butyryloxy-6-carbopropoxybicyclo-[2.2.1]hept-2-ene, 5-hydroxy-6-carbomethoxybicyclo[2.2.1]hept-2-ene, 5-hydroxy-6-carbopropoxybicyclo[2.2.1]hept-2-ene, 5-hydroxy-6-carbopentoxybicyclo[2.2.1]hept-2-ene; the 5-hydroxyalkyl-6-carboxyalkylbicyclo[2.2.1]hept-2-enes such as 5-hydroxymethyl-6-carboxymethylbicyclo[2.2.1]hept-2-ene, 5-hydroxymethyl-6-carboxypentylbicyclo[2.2.1]hept-2-ene, 5-hydroxypentyl-6-carboxypentylbicyclo[2.2.1]hept-2-ene, 5-hydroxypropyl-6-carboxypropylbicyclo-[2.2.1]hept-2-ene; the lower mono- and di-esters of said 5-hydroxyalkyl-6-carboxyalkylbicyclo[2.2.1]hept-2-enes such as 5-acetoxymethyl-6-carboxymethyl-bicyclo[2.2.1]hept-2-ene, 5-butyryloxymethyl-6-carboxyethylbicyclo[2.2.1]hept-2-ene, 5-acetoxypropyl-6-carboxypropylbicyclo[2.2.1]hept-2-ene, 5-acetoxymethyl-6-carbomethoxymethylbicyclo[2.2.1]hept-2-ene, 5-propionoxyethyl-6-carbomethoxyethylbicyclo[2.2.1]hept-2-ene, 5-acetoxypentyl-6-carbobutoxypropylbicyclo[2.2.1]hept-2-ene, 5-hydroxmethyl-6-carbomethoxymethylbicyclo[2.2.1]hept-2-ene, 5-hydroxypropyl-6-carbomethoxymethylbicyclo[2.2.1]hept-2-ene, 5-hydroxypentyl-6-carbopropoxypropylbicyclo[2.2.1]hept-2-ene, 5-hydroxyethyl-6-carbobutoxymethylbicyclo[2.2.1]hept-2-ene, 5-hydroxyethyl-6-carbomethoxypentylbicyclo[2.2.1]hept-2-ene; and the like.

These compounds are readily produced by the Diels-Alder reaction of cyclopentadiene with the appropriate ethylenically unsaturated compound as disclosed in U.S. Pat. No. 2,340,908.

A preferred polyester is that which is the reaction product of 5,6-dicarboxybicyclo[2.2.1]hept-2-ene or its anhydride with the diol 2,2-dimethyl-3-hydroxypropyl 2,2-dimethyl-3-hydroxypropionate wherein the diol is used alone or in admixture with one or more known polyhydroxyl compounds.

The norbornenyl polyesters are characterized by the presence in the polymer molecule of the group:

wherein the ester linkages can be either $-\overset{O}{\underset{\|}{C}}-O-$ or $-O-\overset{O}{\underset{\|}{C}}-$, depending on whether the norbornene starting compound was carboxylic in nature or hydroxylic in nature.

The norbornenyl group can be formed in situ in the polyester, if one wishes to do so. These procedures are known to those skilled in the art and are illustrated by the following description. A polyester was produced by the conventional procedure by reacting maleic anhydride and 2,2-dimethyl-3-hydroxypropyl 2,2-dimethyl-3-hydroxypropionate at about 200° C. using xylene as the solvent medium. Thereafter, dicyclopentadiene is reacted with the polyester by a Diels-Alder reaction of the cyclopentadiene generated to form the norbornenyl group in the polyester chain. While this illustration shows the use of maleic anhydride as the unsaturated site for the formation of the norbornenyl group, it is obvious that the unsaturated site can be introduced into the polyester via any unsaturated carboxylic compound or any unsaturated hydroxyl compound that contains an unsaturated site that will undergo the Diels-Alder reaction with cyclopentadiene or dicyclopentadiene.

The greater the concentration of norbornenyl group in the polyester the faster is the rate at which the coating composition will cure upon exposure to high intensity irradiation. Thus, when a mixture of carboxylic compounds is used, it is preferred to have the norbornenyl-containing compound present in major molar concentration.

Illustrative of the polyesters containing the norbornenyl group that can be used in producing the 100 per cent solids coating compositions of this invention are the polyesters produced from the following mixtures of reactants; the figures in the parenthesis represent the mole per cent of each compound of that particular class present in the reaction mixture.

1.
5,6-dicarboxybicyclo[2.2.1]hept-2-ene; ethylene glycol.

2.
5,6-dicarboxybicyclo[2.2.1]hept-2-ene (75) dimethylterephthalate (25) ethylene glycol.

3.
dimethylester of 5,6-dicarboxybicyclo[2.2.1]hept-2-ene (90) dimethylterephthalate (10) ethylene glycol.

4.
5,6-dicarboxymethylbicyclo[2.2.1]hept-2-ene (80) dimethylterephthalate (20) ethylene glycol.

5.
diethylester of 5,6-dicarboxymethylbicyclo[2.2.1]hept-2-ene (70) dimethylterephthalate (30) ethylene glycol.

6.
5,6-dihydroxybicyclo[2.2.1]hept-2-ene dimethylterephthalate.

7.
5,6-diacetoxybicyclo[2.2.1]hept-2-ene isophthalic acid.

8.
5,6-dihydroxybicyclo[2.2.1]hept-2-ene terephthalic acid (90) p,p'-diphenylcarboxylic acid (10).

9.
5,6-dihydroxybicyclo[2.2.1]hept-2-ene (75) ethylene glycol (25) dimethylterephthalate.

10.
5,6-dihydroxymethylbicyclo[2.2.1]hept-2-ene (70) ethylene glycol (30) dimethylterephthalate.

11.
5,6-diacetoxymethylbicyclo[2.2.1]hept-2-ene (90) ethylene glycol (10) dimethylterephthalate.

12.
5-hydroxy-6-carboxybicyclo[2.2.1]hept-2-ene.

13.
5-hydroxy-6-carboxybicyclo[2.2.1]hept-2-ene (80) 3-hydroxypropionic acid (20).

14.
5-carboxy-6-acetoxybicyclo[2.2.1]hept-2-ene (90) 7-hydroxypentanoic acid (10).

15.
5-acetoxy-6-carbomethoxybicyclo[2.2.1]hept-2-ene (50) p-hydroxybenzoic acid (50).

16.
5-hydroxy-6-carbomethoxybicyclo[2.2.1]hept-2-ene (60) 6-hydroxyhexanoic acid (40).

17.
5-hydroxymethyl-6-carboxymethylbicyclo[2.2.1]hept-2-ene (50) 6-hydroxyhexanoic acid (50).

18.
5-acetoxymethyl-6-carboxymethylbicyclo[2.2.1]hept-2-ene (50) 6-hydroxyhexanoic acid (50).

19.
5-acetoxymethyl-6-carbomethoxymethylbicyclo[2.2.1]hept-2-ene (60) 7-hydroxypentanoic acid (40).

20.
5-hydroxymethyl-6-carbomethoxymethylbicyclo[2.2.1]hept-2-ene (50) 7-hydroxypentanoic acid (50).

21.
5,6-dicarboxybicyclo[2.2.1]hept-2-ene 5,6-dihydroxybicyclo[2.2.1]hept-2-ene.

22.
5,6-dicarboxymethylbicyclo[2.2.1]hept-2-ene 5,6-dihydroxybicyclo[2.2.1]hept-2-ene.

23.
dimethylester of 5,6-dicarboxyethylbicyclo[2.2.1]hept-2-ene 5,6-dihydroxybicyclo[2.2.1]hept-2-ene.

24.
5-hydroxy-6-carboxybicyclo[2.2.1]hept-2-ene 5-hydroxy-6-carbopropoxybicyclo[2.2.1]hept-2-ene.

25.
bicyclo[2.2.1]hept-5-en-2,3-dicarboxylic acid anhydride 2,2-dimethyl-3-hydroxypropyl 2,2-dimethyl-3-hydroxypropionate.

26.
bicyclo[2.2.1]hept-5-en-2,3-dicarboxylic acid anhydride 2,2-dimethyl-3-hydroxypropyl 2,2-dimethyl-3-hydroxypropionate (94). Pentaerythritol (6).

The polyesters can be modified by reaction thereof with an isocyanate. This was found to yield modified polyesters that when used in 100 percent solids coating compositions produced compositions that cured to solids in a much shorter period of time. The preferred are the polyisocyanates such as the diisocyanates containing the norbornenyl group, e.g., bis(2-isocyanatoethyl) bicyclo[2.2.1]hept-5-en-2,3-dicarboxylate, bicyclo[2.2.1]hept-5-en-2,3-diisocyanate, bicyclo[2.2.1]hept-5-en-2,3-di(methylisocyanate), and the like. In addition, however, conventional known isocyanates can be used, for example, 1,6-hexamethylenediisocyanate, methylcyclohexane-2,4-diisocyanate, methylcyclohexane-2,6-diisocyanate, 3,5,5-trimethylcyclohexane-1,3-diisocyanate, and the like. The reaction of an isocyanate compound with a polyester is a well known chemical reaction and requires no further explanation to enable one skilled in the art to conduct it.

The high boiling acrylyl esters that are useful in this invention can contain more than one acrylyl group in the molecule; they are represented by the general formula:

(IV)     $(CH_2=\overset{R'''}{\underset{|}{C}}COO)_zR''$ wherein R''' can be hydrogen or methyl; z is an integer having a value of from 1 to about 4; and R'' can be a monovalent group such as hydrogen; alkyl of from one to about 18 carbon atoms (e.g., methyl, ethyl, propyl, isopropyl, butyl, isobutyl, t-butyl, pentyl, hexyl, 2-methylhexyl, 2,3-dimethylbutyl, neopentyl, heptyl, neohexyl, 3,3-dimethylpentyl, octyl, 2-ethylhexyl, nonyl, decyl, etc.); hydroxyalkyl having up to about 10 carbom atoms (e.g., hydroxymethyl, 2-hydroxyethyl, hydroxyisopropyl, 2-hydroxy-1-propyl, hydroxyhexyl, hydroxydecyl, etc); alkyoxyalkyl having up to about 15 carbon atoms (e.g., methoxymethyl, methoxybutyl, methoxydecyl, ethoxyethyl, ethoxyoctyl, butoxyethyl, butoxypropyl, hexoyethyl, decoxyethyl, decoxypentyl, etc.); haloalkyl wherein the alkyl group has up to about 15 carbon atoms as defined above and the halogen can be fluorine, chlorine, bromine or iodine (e.g., chloromethyl, chlorodecyl, fluoroethyl, bromethyl, iodomethyl, dichloroethyl, perfluoroisopropyl trichlorobutyl, etc); cyano; cyanoalkyl wherein the alkyl group has up to about 15 carbon atoms as defined above (e.g., cyanomethyl, cyanoalkyl, cyanobutyl, cyanodecyl, etc.); epoxyalkyl wherein the alkyl group has up to about 15 carbon atoms as defined above (e.g., glycidyl, 4,5-epoxypentyl, 2,3-epoxycyclohexyl, etc.); aryl (e.g., phenyl, xylyl, tolyl, naphthyl, naphthal, benzyl, etc.); aryloxyalkyl wherein the alkyl group has up to about 15 carbon atoms as defined above (e.g., 2-phenoxyethyl, 10-phenoxydecyl, 2-tolyloxyethyl, 2-naphthyloxyethyl, etc.); trialkoxysilyloxyalkyl wherein the alkoxy group has from one to about five carbon atoms and the alkyl group has up to about 15 carbon atoms as defined above (e.g., trimethoxysilyloxymethyl, trimethoxysilyloxypropyl, trimethoxysilyloxydecyl, triethoxysilyloxyethyl, triethoxysilyloxybutyl, tripropoxysilyloxyethyl, tributoxysilyloxyethyl, etc.); —CONR$_2''''$ wherein R'''' can be hydrogen or hydrocarbyl having up to about 15 carbon atoms (e.g., N-methyl, N-ethyl, N-propyl, N-butyl, N-decyl, N,N-dimethyl, N,N-diethyl, N,N-diisobutyl, N-cyclohexyl, N,N-dicyclohexyl, N-phenyl, N-naphthyl, N-methyl-N-phenyl, N,N-diphenyl, N-benzyl, N,N-dibenzyl,N-tolyl, etc.); dicyclopentenyl; bicyclo[2.2.1]hept-2-en-5-yl; bicyclo-[2.2.1]hept-2-en-5-ylalkyl, wherein the alkyl group has from one to about four carbon atoms (e.g., bicyclo[2.2.1]hept-2-en-5-ylmethyl, bicyclo[2.2.1]hept-2-en-5-ylpropyl, etc.); R'' can also be a polyvalent group such as a divalent —C$_p$H$_{2p}$— group wherein p has a value of from 1 to about 10 (e.g., methylene, ethylene, propylene, isopropylene, butylene, hexylene, 2,2-dimethylbutylene, 2-ethylhexylene, decylene, etc.); —C$_w$H$_{2w}$(OC$_w$H$_{2w}$)$_v$— wherein w has a value of from 2 to about 4 and v has a value of from 1 to about 5,000 and the oxyalkylene portion thereof can be oxyethylene, oxypropylene, 2-oxypropylene, oxybutylene, or mixed oxyalkylene groups in the same molecule, etc.;

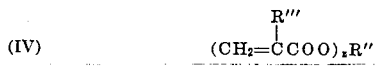

a trivalent aliphatic hydrocarbon of the formula C$_q$H$_{2q-1}$ wherein q has a value of from 3 to about 10

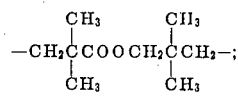

tetravalent aliphatic hydrocarbon of the formula C$_s$H$_{2s-2}$ wherein s has a value of from 4 to about 10 (e.g.

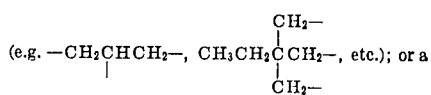

The acrylyl compounds defined by Formula IV above are well known in the art and many of them are described in "Vinyl and Related Polymers" by C. E. Schildknecht, published in 1952 by John Wiley and Sons. The common knowledge of these compounds makes the specific naming thereof in this application unnecessary in view of the extensive description set forth above.

The 100 percent solids coating compositions are produced by mixing the selected components thereof by conventional known methods. The blend can be heated, if desired, to facilitate mixing.

The coating compositions can be applied by conventional means and including spray, curtain, dip, pad and roll-coating techniques and may, if desired, be dried under ambient or oven conditions to provide coating films on the substrate. The substrate can be any composition, e.g., wood, metal, paper, plastic, fabric, fiber, ceramic, concrete, plaster, glass, etc.

Also, the process of this invention can be used to cross-link the other crosslinkable norbornenyl containing polymers disclosed in the copending application Ser. No. 697,635, filed on Jan. 15, 1968 and now abandoned, which disclosure is hereby incorporated by reference. The polymers disclosed in U.S. application Ser. No. 697,635 include polyamides, polyethers, polyurethanes, polyureas and vinyl polymers wherein the norbornenyl group is part of the backbone of the polymer chain; the application also discloses polymers wherein the norbornenyl group is pendant to the polymer backbone. Said application fully discloses the polymers and the methods for their production.

While reference has been made herein to 100 per cent solids coating composition, it is to be understood that conventional coating compositions can also be used to coat articles and the coating is cross-linked after evaporation of the volatile solvent. Further, it is also to be understood that the coating compositions can contain a free radical initiator or other catalyst.

Cross-linking by the processes of this invention can be carried out at any temperature of from about 0° C., or lower, to about 150° C., or higher. Neither the temperature nor the pressure are critical. Preferably an inert atmosphere can be maintained in the irradiation area, however this is not essential. Among the inert gases that can be used one can mention nitrogen, carbon dioxide, argon, helium, neon, xenon, and the like. The irradiation time can vary from as little as 0.01 second to about 10 minutes, or more. However, it has been found that maximum cross-linking is achieved in about 0.1 seconds to about 60 seconds. The time required for optimum cross-linking or curing will vary with the specific reactants and with the properties desired by the scientist in the final product. The polymer composition can be positioned at any reasonable distance from the arc of the swirl-flow plasma arc radiation source; the distance will be determined by the area to be irradiated, the polymer system employed and the time that the sample is to be exposed. It has been generally observed that the curing time decreases rapidly as the distance between the polymer and the arc decreases. In the laboratory, distances of less than five feet have been employed, but the distance can be greater than this in large scale commercial operations.

A single source generating high intensity predominantly continuum light radiation, for example, a swirl-flow plasma arc radiation means can be used or one may choose to use two or more sources of high intensity predominantly continuum light radiation. Generally, the greater the intensity of the predominantly continuum light radiation, the faster will be the cure. Further, where a large object, such as a coated building panel, household appliance, or automobile body, is involved a bank of high intensity predominantly continuum light radiation sources can be positioned around the object as it is conveyed through the area and exposed to the high intensity light radiation in order to rapidly cross-link the coating on the complete surface.

The process of this invention can be used or irradiate shaped polymers, for example, self-supporting films, fibers, molded or extruded shapes, to cross-link the polymer, as well as laminates of the polymer on solid substrates such as wood, paper, fabric, metal, glass, mineral, plastic, etc. It can also be used to cross-link the polymer after a fibrous material has been impregnated or coated therewith.

In some instances wherein a solid polymer cannot be produced by the previously known methods, exposure to the high intensity predominantly continuum light radiation from the swirl-flow plasma arc radiation source has converted liquid, low molecular weight polymers to solid self-supporting films. This can be done continuously by casting a film of the liquid polymer on a substrate, e.g., a moving belt, passing the film on the belt under the high intensity predominantly continuum light radiation and stripping off the solid film.

The high intensity predominantly continuum light radiation emanating from the artificial light generating means can also be used to irradiate polyethylene foam structures to cross-link the polyethylene and improve the physical and mechanical properties of the polyethylene foam article. This is also true of other polyolefin foams.

Insulation on electrical conductors, wherein the conductor is sodium, copper, aluminum, silver, or any other metal or alloy, can be cross-linked with the high intensity predominantly continuum light radiation from the radiation source by exposing the insulated conductor to the high intensity predominantly continuum light radiation. It was found that polyethylene insulation cured after about 60 seconds exposure to the high intensity predominantly continuum light radiation. An insulated sodium conductor having a one quarter inch thick insulation of a copolymer of a mixute of ethylene and about one mole per cent of bicyclo[2.2.1]hept-2,5,-diene and containing 0.5 weight per cent p-methoxybenzophenone as photosensitizer reached its optimum cross-linking after being exposed for about 12 seconds to the high intensity predominantly continuum light radiation from an argon 30 kilowatt swirl-flow plasma arc radiation source. Similar results are obtained with polyethylene insulations having densities of from about 0.915 to about 0.97 g./cc., or higher. Polypropylene can also be used as the insulant.

Curing or cross-linking of the crosslinkable polymers can be carried out on mixtures thereof with known crosslinkers such as the dinorbornene compounds disclosed and described in U.S. application Ser. No. 759,759, filed on Sept. 13, 1968. The disclosure therein is incorporated herein by reference. It is to be understood that any of the known crosslinkers can be used including but not limited to the polyunsaturated crosslinkers such as triallyl cyanurate, allyl acrylate, allyl methacrylate, diallyl terephthalate, N,N'-methylene diacrylamide, 1,2-ethylene diacrylate, diallyl maleate, diallyl fumarate, 1,2-ethylene dimethacrylate, hexamethylene bis maleimide, triallyl phosphate, trivinyl trimellitate, divinyl adipate, trimethylolpropane triacrylate, glyceryl trimethacrylate, diallyl succinate, divinylbenzene, and the like, can also be used. The crosslinkers can be present at concentrations as high as about 90 per cent, or more, but preferably less than 50 per cent.

Further the rate and extent of cross-linking can be enhanced by blending the crosslinkable polymer with a photosensitizer or free radical generator. Illustrative of known photosensitizer compounds one can mention acetophenone, propiophenone, benzophenone, xanthone, fluorenone, benzaldehyde, fluorene, anthraquinone, triphenylamine, carbazole, 3-or 4-methylactophenone, 3-or 4-pentylacetophenone, 3- or 4-methoxyacetophenone, 3- or 4-bromoacetophenone, 3- or 4-allylacetopheneone, p-diacetylbenzene, 3- or 4-methoxybenzophenone, 3- or 4-methylbenzophenone, 3- or 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone, 3-methoxyxanthone, 3-iodo-7-methoxyxanthone, and the like. As free radical initiators, one can mention the dialkyl peroxides (cyclic or acyclic), diaryl peroxides, hydroperoxides, peracids, peresters, azo compounds, and other known free radical sources. Illustrative thereof are di-tert-butyl peroxide, benzoyl peroxide, 2,4-dichlorobenzoyl peroxide, t-butyl-hydroperoxide, 2,5-dimethyl-2,5-bis(hydroperoxy)-hexane, peracetic acid, perbenzoic acid, t-butyl peroxypivalate, t-butyl peracetic,azo-bisisobutyronitrile, and the like.

As is obvious, one can use one or more photosensitizers or free radical initiators or combinations of each type or of both types. It is to be understood that any known photosensitizer or free radical initiator can be used; one is not restricted to those specifically referred to above. The amount of photosensitizer or free radical initiator can vary from about 0.01 to about 20 weight per cent of the polymer. A preferred amount is from about 0.1 to about five weight per cent, and most preferred is from about 0.5 to about two weight per cent. In some instances, a synergistic effect is noted by the use of mixtures. For example, the mixture of benzophenone and 2,4-dichlorobenzoyl peroxide to cross-link siloxane polymers or the mixtures of benzophenone and triethanolamine(which for purposes of this invention is considered a free radical initiator)or 4-methoxybenzophenone and triethanolamine to cross-link 100 per cent solids coating compositions containing a high boiling acrylate monomer and a polymer such as a polyester or a polyurethane.

In the following examples, which are illustrative of the invention, the following test procedures were used to evaluate the products.

Tests

| | | |
|---|---|---|
| Hardness (Shore A Units) | ASTM | D2240-64T |
| Elongation, % | ASTM | D638 -67T |
| Tensile strength, p.s.i. | ASTM | D638 -67T |
| Set at break, % | ASTM | D638 -67T |
| Melt index, dgm/min. | ASTM | D1248-68 |
| Density, g./cc. | ASTM | D1248-68 |
| Stiffness, p.s.i. | ASTM | D638 -67T |
| Tensile modulus, p.s.i. | ASTM | D638 -67T |

Tensile strength on paper using a two-inch strip of paper, p.s.i.
— ASTM No. 1682-59T

EXAMPLE 1

An ethylene/vinyl acetate copolymer, 300 grams, having about 16.2 weight per cent vinyl acetate was dissolved in 1,400 grams of toluene by heating to the reflux temperature. Methanol, 129 grams, was added at 70° C., and then 23.2 grams of a 25 per cent methanolic solution of sodium methoxide was added. The solution was refluxed for several hours, cooled, poured into methanol and filtered to recover the hydrolyzed copolymer. This was washed with methanol until neutral and dried in a vacuum oven. The hydrolyzed copolymer, 100 grams (equivalent to 0.125 mole of vinyl alcohol), 500 ml. of benzene and 10 ml. of pyridine were charged to a one liter flask and 50 ml. of the solution was azeotropically distilled to remove traces of water. Over a 15 minute period 20.5 grams of 5-chloroformylbicyclo[2.2.1]-hept--2-ene were added to the refluxing solution and then refluxing was continued for another hour. The solution was cooled to 40°C. and methanol was slowly added until it became cloudly; then two liters of methanol were quickly added. The ethylene/vinyl bicyclo[2.2.1]hept-2-en-5-carboxylate copolymer was filtered, washed with methanol and dried; it contained the following units in the polymer chain:

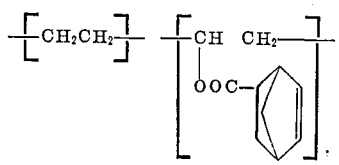

Blends of this copolymer with different additives were prepared by addition of one weight per cent of various photosensitizers to the copolymer and milling at 120°C. until homogeneous compositions were obtained. The blends were pressed into plaques five inches in diameter and ten mils thick at mold temperatures of 120°C. to 150°C. One inch square samples were cut from these plaques and irradiated for various periods of time by exposure to the high intensity predominantly continuum light radiation emanating from a 50 kilowatt swirl-flow plasma arc radiation source employing argon as the gaseous medium. The samples were irradiated at a distance of one foot from the arc. After irradiation the films were extracted with hot ethylbenzene to constant weight to determine the extent of cure that had been achieved. The cured copolymer was insoluble whereas the uncured copolymer was soluble in the hot solvent. It was found that about 90 per cent cure was achieved in about one minute. This fast rate of curing on exposure to high intensity predominantly continuum light radiation was completely unexpected and unobvious. Samples cured using a 550 watt mercury lamp required about 20 minutes of exposure to obtain cures similar to those obtained in 20 seconds with the light radiation from the swirl-flow plasma arc radiation source. The results are tabulated below:

| Radiation Source | SFPA | | | | Mercury Lamp | | | | |
|---|---|---|---|---|---|---|---|---|---|
| Exposure Time | Seconds | | | | Minutes | | | | |
| | 5 | 10 | 20 | 60 | 2 | 5 | 20 | 60 | 120 |
| Additive | Percent Insoluble Copolymer | | | | | | | | |
| p-Methoxybenzophenone | 77 | 86 | 88 | 96 | 48 | 72 | 91 | 93 | 92 |
| 3-Chloroxanthone | 32 | 63 | 64 | 89 | 25 | 47 | 76 | 86 | — |
| Benzophenone | 58 | 66 | 85 | 89 | 42 | 61 | 85 | 87 | 92 |
| None | 1 | 8 | 34 | 54 | 25 | 32 | 34 | 62 | |
| SFPA = Swirl-flow plasma arc radiation source | | | | | | | | | |

EXAMPLE 2

A copolymer of 98.9 mole per cent ethylene and 1.1 mole per cent bicyclo[2.2.1]hept-2,5-diene was produced by polymerizing a mixture of said monomers in a conventional stirred reactor at a temperature of about 200°C. to 210°C. and a pressure of about 16,500 p.s.i. The catalyst used was 216 molar p.p.m. of azo-bis-isobutyronitrile in acetone solution. The copolymer had a melt index of 5.3 dgm./min. and a density of 0.9281 g./cc.

Blends of the copolymer were produced with different photosensitizer additives, in the manner described in Example 1, and 100 mil thick film plaques were produced for irradiation. The photosensitizer was present at a concentration of one weight per cent. The films were irradiated at a distance of one foot from the same arc and the extent of cross-linking was determined by measuring the amount of insoluble copolymer remaining after extraction with hot ethylbenzene. For comparison purposes the same films were irradiated with a 550 watt mercury lamp. The rapid curing rate of this thick a film upon exposure to the radiation from the swirl-flow plasma arc radiation source was a completely unexpected and unobvious finding. The data show that increasing the concentration of the additive increases the amount of cross-linking that occurs in the same period of exposure to radiation. The results are tabulated below:

| Radiation Source | SFPA | | | | Mercury lamp | | | | |
|---|---|---|---|---|---|---|---|---|---|
| Exposure Time | Seconds | | | | Minutes | | | | |
| | 5 | 10 | 20 | 60 | 2 | 5 | 20 | 60 | 300 |
| Additive | Percent Insoluble Copolymer | | | | | | | | |
| 3-Chloroxanthone | 31 | 36 | 44 | 70 | 30 | 42 | 56 | 63 | 65 |
| Chlorononylxanthone | 18 | 33 | 63 | 69 | 21 | 39 | 51 | 64 | 63 |
| p-Methoxybenzo-phenone | 21 | 33 | 40 | 55 | 21 | 29 | 44 | 47 | 53 |
| p-Methoxyacetophenone(a) | 26 | 32 | 47 | 65 | | | | | |
| p-Methoxyacetophenone(a) | 19 | 21 | 30 | 51 | 20 | — | 56 | 64 | — |
| p-Methoxyacetophenone(b) | 15 | 19 | 31 | 36 | | | | | |
| Propiophenone | 2 | 5 | 12 | 30 | | | | | |
| Propiophenone(a) | 21 | 19 | 41 | 52 | | | | | |
| None | 10 | 11 | 19 | 24 | | | | | |
| SFPA = Swirl-flow plasma arc radiation source | | | | | | | | | |
| a — at 5 weight percent concentration | | | | | | | | | |
| b — at 0.5 weight percent concentration | | | | | | | | | |

EXAMPLE 3

An ethylene/5-ethylidenebicyclo[2.2.1]hept-2-ene copolymer was produced by polymerizing a mixture of ethylene and one mole per cent 5-ethylidenebicyclo[2.2.1.]hept-2-ene at a pressure of 23,500 p.s.i. and a temperature of 195° C. The catalyst was dilauryl peroxide. The copolymer had a melt index of dgm./min. and a density of 0.9284 g./cc.

The copolymer was blended with several different photosensitizer additives and molded into 10 mils plaques by a procedure similar to that described in Example 1. Portions of each plaque were irradiated with an argon swirl-flow plasma arc radiation source at a distance of one foot from the arc. Even in the absence of a photosensitizer the copolymer cured to the extent of 15 per cent in sixty seconds. The fast cure rate obtained was unexpected and completely unobvious. The results are set forth below:

| | Conc. Wt.% | Percent Insoluble Copolymer | | | |
|---|---|---|---|---|---|
| Exposure time, sec. | | 5 | 10 | 20 | 60 |

| Additive | | | | |
|---|---|---|---|---|
| 3-Chloroxanthone | 1 | 40 | 44 | 68 | 74 |
| p-Methoxybenzophenone | 5 | 18 | 39 | 46 | 70 |
| p-Methoxybenzophenone | 1 | 24 | 32 | 44 | 64 |
| p-Bromobenzophenone | 1 | 22 | 25 | 50 | 42 |
| None | | 4 | 3 | 7 | 15 |

EXAMPLE 4

Ten mil thick films were produced using the ethylene/bicyclo[2.2.1]hept-2,5-diene copolymer of Example 2 blended with one weight per cent of p-methoxyacetophenone. Three of these films were stacked on top of each other and separate stacks were irradiated with light radiation from an argon 50 kilowatt swirl-flow plasma arc radiation source and from a 550 watt medium pressure mercury lamp, both at a distance of one foot. All three layers of films in the stack exposed to the swirl-flow plasma arc radiation source unexpectedly showed a greater cure after 60 seconds than the respective layers in the stack exposed to the mercury arc for 60 minutes. This experiment also established that the process of this instant invention could be used to cure multiple layers at the same time. The results are set forth below:

|  |  | Percent Insoluble Copolymer | | |
|---|---|---|---|---|
| Radiation Source | Exposure Time | Top Film | Middle Film | Bottom Film |
| SFPA | 60 seconds | 67 | 54 | 48 |
| Mercury lamp | 60 minutes | 41 | 24 | 14 |
| SFPA=Swirl-flow plasma arc radiation source | | | | |

EXAMPLE 5

A commercially available silicone rubber gumstock having an average molecular weight of about 400,000 containing about 64.5 per cent of a solid dimethylsiloxane (98.8)/methyl vinyl siloxane (0.2) copolymer, about 9.5 per cent of a liquid low molecular weight ethoxy end-blocked poly(dimethylsiloxane) and 26 per cent silica filler was blended on a roll mill with different additives until homogeneous mixtures were obtained. The homogeneous blends were cold pressed into 100 mil sheets which were irradiated at a distance of two feet with the swirl-flow plasma arc radiation source described in Example 1. The results set forth below show the unexpected rapid curing achieved by the process of this invention even on polymeric compositions containing inert inorganic fillers; they also show that rapid, uniform curing can be obtained through thick sheets. Cross-linking was not observed on the silicone rubber when the additive was not added thereto.

| Additive | Conc. wt. percent | Exposure time, seconds | Hardness (Shore A units) | Elongation, percent | Tensile, p.s.i. | Set at break, percent |
|---|---|---|---|---|---|---|
| None | | 300 | *** | *** | <100 | *** |
| Silanic hydrogen crosslinker* | 3.2 | 180 | 16 | 90 | 780 | 68 |
|  |  | 300 | 17 | 200 | 833 | 47 |
| Dichlorobenzoyl peroxide** | 1.6 | 30 | 40 | 365 | 610 | 15 |
|  |  | 60 | 47 | 700 | 610 | 6 |
|  |  | 120 | 52 | 930 | 500 | 0 |
| 2,5-dimethyl-2,5-di(t-butyl peroxy) hexane | 0.64 | 60 | 26 | 840 | 1,010 | 17 |
|  |  | 120 | 30 | 1,040 | 900 | 10 |
|  |  | 180 | 33 | 1,175 | 770 | 6 |
| Benzophenone | 0.64 | 40 | 15 | 60 | 625 | 70 |
|  |  | 60 | 23 | 90 | 700 | 40 |
|  |  | 120 | 34 | 940 | 975 | 12 |
| Silanic hydrogen crosslinker* | 3.2 | 30 | 18 | 75 | 500 | 30 |
| Benzophenone | 0.64 | 60 | 20 | 200 | 725 | 27 |
|  |  | 120 | 20 | 400 | 750 | 19 |
| Dichlorobenzoyl peroxide** | 1.6 | 20 | 45 | 870 | 630 | 4 |
| Benzophenone | 0.64 | 30 | 50 | 1,215 | 610 | 1 |
|  |  | 60 | 52 | 1,250 | 620 | 1 |
|  |  | 90 | 48 | 1,140 | 500 | 1 |
| Benzophenone | 0.64 | 30 | 18 | 130 | 915 | 60 |
| 2,5-dimethyl-2,5-di(t-butyl peroxy) hexane | 0.64 | 60 | 29 | 520 | 1,000 | 24 |
|  |  | 90 | 35 | 700 | 850 | 12 |
|  |  | 120 | 26 | 630 | 850 | 13 |

*Poly(methyl hydrogen siloxane) end-blocked with trimethylsilyl groups; viscosity 30 cps. at 25° C.
**As a 50 percent paste in a low molecular weight poly(dimethylsiloxane).
***Too low to measure.

EXAMPLE 6

A mixture of 490 grams of a commercially available polycaprolactone diol having an average molecular weight of about 2,000 of the structural formula:

$$HO[(CH_2)_5COO]_nCH_2CH_2OCH_2CH_2[OOC(CH_2)_5]_mOH$$

and six grams of 2-ethoxyethanol was heated to 80° C. in a polymerization reactor. Over a 35 minute period 320.3 grams of di(2-isocyanatoethyl)bicyclo[2.2.1]hept-5-en-2,3-dicarboxylate were added and then the mixture was stirred for another hour at 80° C. During the addition, an exotherm of 94° C. was reached. At the end of the hour, another six grams of 2-ethoxyethanol were added and the mixture was stirred for 30 minutes at 80° C. The urethane polymer had an inherent viscosity of 0.42 as determined at 30° C. using a 0.5 per cent solution in m-cresol.

A 50 per cent solution of the above urethane polymer, containing one weight per cent of p-methoxybenzophenone, based on the polymer, was prepared in methyl ethyl ketone. Films of this solution were cast on glass plates and the solvent was evaporated to leave a highly viscous fluid film about 10 mils thick. The film was irradiated at a distance of one foot from a 50 kilowatt argon swirl-flow plasma arc radiation source to produce a self-sustaining plastic film within 30 seconds. To achieve about the same degree of cure with a 550 watt medium-pressure mercury arc required an irradiation time of 25 minutes. Irradiated to the same degree of insolubilization, the film irradiated with the swirl-flow plasma arc radiation source had better physical properties.

| Radiation source | Exposure time | Percent Insoluble copolymer | Stiffness, p.s.i. | Tensile, p.s.i. | Elongation, percent |
|---|---|---|---|---|---|
| SFPA | 30 seconds | 88 | 605 | 231 | 61 |
| Mercury lamp | 25 minutes | 90 | 377 | 182 | 98 |

EXAMPLE 7

A blend of a commercially available polyethylene having a melt index of 0.8 dgm./minute and a density of 0.9613 g./cc. with one weight per cent 3-chloroxanthone was prepared and 10 mil thick plaques were produced by pressure molding at 190° C. The plaques were irradiated at a distance of one foot from a 50 kilowatt argon swirl-flow plasma arc radiation source for different exposure times and extracted with boiling ethylbenzene to constant weight to determine the extent of gel or cross-linking. Irradiation for five seconds resulted in 12 per cent cure, for 10 seconds in 15 per cent cure, for 20 seconds in 24 per cent cure, and for 60 seconds in 50 per cent cure.

EXAMPLE 8

A mixture of 100 grams of cellulose acetate (38.3 per cent acetyl content) and one liter of methyl ethyl ketone was heated to 60° C. and two drops of dibutyl tin dilaurate were added. Over a 55 minute period, 100 grams of bicyclo[2.2.1]hept-5-en-2-ylmethylisocyanate were added and stirring was continued for 21 hours at 60° C. Benzene was added to the cooled solution to precipitate the cellulose acetate bicyclo[2.2.1]hept-5-en-2-ylmethylcarbamate polymer, which was filtered, washed with isopropanol and dried. Elemental analysis established that all the available hydroxyl groups had reacted with the isocyanate and formed carbamyl groups.

The cellulose acetate-5-norbornen-2-ylmethylcarbamate copolymer was used to produce films about 10 mils thick. The films were irradiated at a distance of two feet from a 50 kilowatt argon swirl-flow plasma arc radiation source, under a blanket of nitrogen. Portions of the film were removed at different times and extracted with hot acetone to constant weight to determine the extent of cross-linking. After 30 seconds exposure the polymer showed 21 per cent cross-linking, after 60 seconds the polymer was cross-linked to the extent of about 32 per cent, and after 120 seconds cross-linking had proceeded to the extent of 77 per cent.

A second series of irradiations was carried out using films produced from a blend of the same copolymer containing one weight per cent xanthone. Irradiation for five seconds resulted in 47 per cent cross-linking, after 30 seconds the polymer was cross-linked to the extent of about 75 per cent, and after 60 seconds cross-linking had reached a maximum of 88 per cent.

EXAMPLE 9

The same copolymer described in Example 1 was used to produce films 10 mils thick which were then irradiated as described in Example 8. The extent of cross-linking achieved after exposure is set forth below:

| Exposure Time, Seconds | Cross-linking, % |
|---|---|
| 7 | 26 |
| 15 | 33 |
| 33 | 39 |
| 60 | 48 |
| 150 | 60 |
| 300 | 74 |

EXAMPLE 10

A solution of 54.8 grams of 4,5 di-(chlorocarbonyl)-bicyclo[2.2.1]hept-2-ene in 100 ml. of toluene was slowly added, while stirring, to 100.7 grams of polyethylene glycol having an average molecular weight of about 400 that was dissolved in 59.3 grams of pyridine and 250 ml. of toluene. The reaction flask was purged with nitrogen during the addition. An exothermic reaction occurred with the temperature rising to 80° C. The viscous solution was refluxed at 110° C. for one hour and poured into a solution of four liters of water and one liter of chloroform. The mixture was thoroughly shaken, the chloroform layer was removed and dried over anhydrous magnesium sulfate, and the solvents distilled off under reduced pressure. The viscous polyester was vacuum distilled at 100° C. and 0.3 mm. mercury pressure for 1.5 hours to yield 111.9 grams of the brownish, viscous, tacky polyester having the repeating unit:

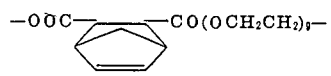

A film was cast from the polyester and irradiated for 10 minutes at a distance of four feet from the arc of a 50 kilowatt argon swirl-flow plasma arc radiation source. The polyester cross-linked to a rubbery film that was 74 per cent insoluble in hot benzene, the polyester was completely soluble in the same solvent prior to irradiation.

A period of 2.2 hours (132 minutes) is necessary to achieve about the same amount of cross-linking with a 550 watt high pressure mercury lamp positioned only 16 inches from the film.

EXAMPLE 11

A polymerization reactor was equipped with a stirrer, nitrogen purge, thermometer and addition tube and immersed in an oil bath. About 30.8 grams OF 5,6-di(hydroxymethyl)bicyclo-[2.2.1]hept-2-ene was placed in the reactor, purged with nitrogen, and heated to 125° C. A total of 33.6 grams of 1,6-hexamethylenediisocyanate was slowly added while raising the temperature to 170° C. so that the reaction reached this temperature at about the same time that the addition of the diisocyanate was completed. The urethane polymer was very viscous and fibers could be easily pulled from the molten mass. The polymer had repeating units of the formula:

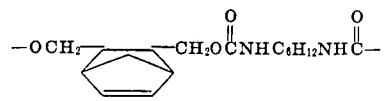

It was soluble in a 1:1 chloroform-methanol solution and films were cast from solutions thereof. Films and plaques were also produced by compression molding. The urethane polymer had a tensile modulus of 213,000 p.s.i., a tensile strength of 9,400 p.s.i. and an elongation of 6.3 per cent. The cast film, 10 mils thick, was irradiated with the light radiation from a 50 kilowatt swirl-flow plasma arc radiation source at a distance of one foot for 30 seconds and it was cross-linked to the extent of 48 per cent insolubilization. The same polymer required over 20 hours of exposure to ultraviolet radiation from a 100 watt mercury lamp to achieve about the same degree of cross-linking.

EXAMPLE 12

Ethylene/5-vinylbicyclo[2.2.1]hept-2-ene copolymer was produced by polymerizing a mixture of ethylene and 0.5 mole per cent 5-vinylbicyclo[2.2.1]hept-2-ene at a temperature of about 200° C. and a pressure of about 25,000 p.s.i. The catalyst was dilauryl peroxide. A blend of four runs of copolymers having melt indices of 164 dgm./min. and a density of about 0.93 g./cc. was used in the following treatment.

The copolymers contained polymerized units of the formulas:

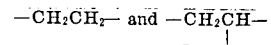 

in the molecule and they were soluble in boiling ethylbenzene.

Films were molded to a thickness of 10 mils and then irradiated with the light radiation from a 50 kilowatt argon swirl-flow plasma arc radiation source at a distance of one foot from the light source.

The same copolymer mixture was blended with one weight per cent p-methoxybenzophenone and films thereof were similarly exposed to the swirl-flow plasma arc radiation source. The results, tabulated below show the unexpected advantages accruing from the use of selected photosensitizing agents; the amount of cross-linking was two and one-half times as great. Cross-linking was determined by measuring the amount of insoluble polymer remaining after repeated extractions with boiling ethylbenzene.

| Exposure time, seconds | Percent insolubles | |
|---|---|---|
| | Without additive | With 1 wt. per-cent p-methoxy-benzophenone |
| 5 | 5 | 11.4 |
| 10 | 8.9 | 23.4 |
| 20 | 12.6 | 58.9 |
| 60 | 20.6 | |

EXAMPLE 13

An ethylene/bicyclo[2.2.1]hept-5-en-2-ylmethyl acrylate copolymer was produced by polymerizing a mixture of ethylene and 0.05 mole per cent bicyclo[2.2.1]hept-5-en-2-ylmethyl acrylate at about 205° C. and a pressure of about 19,000 p.s.i. The catalyst was an isopropanol solution of azobis(isobutyronitrile). The copolymer had a density of 0.9233 g./cc. The copolymer contained polymerized units of the formulas:

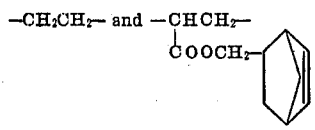

in the molecule. It had a melt index of about 1.5 dgm./minute and it was soluble in boiling ethylbenzene.

Films, 10 mils thick, were irradiated as described in Example 12. In the absence of any added photosensitizer the copolymer cross-linked to the extent of five per cent after a 60 second exposure to the argon swirl-flow plasma arc radiation source. Films produced from a blend of the copolymer with one weight per cent 3-chloroxanthone showed more than five per cent cross-linking after less than three seconds exposure to this irradiation source and over 60 per cent cross-linking after a 35 second exposure. The results are tabulated below:

| Exposure Time seconds | Per Cent Insolubles | |
|---|---|---|
| | Without Additive | With 1 wt. % 3-chloroxanthone |
| 5 | 0.9 | 12.5 |
| 10 | 0.1 | 28.2 |
| 20 | 3.1 | 46.7 |
| 60 | 6.9 | 61.2 |

EXAMPLE 14

A series of polymers was produced and used to impregnate paper to improve the wet strength characteristics of the paper. The polymers were produced as follows:

Polymer A — The urethane polymer described in Example 18.

Polymer B — A urethane polymer produced as described in Example 6 except that 7.5 grams of 2-ethoxyethanol were used in each addition. The urethane polymer had an inherent viscosity of 0.33 as determined at 30° C. using a 0.5 per cent solution in m-cresol.

Polymer C — Using the procedure described infra for Polymer D, 128.3 grams of the propylene oxide adduct of glycerol having an average molecular weight of about 1,000 and an hydroxyl number of about 168 were reacted with about 88 grams of bis(2-isocyanatoethyl)bicyclo]2.2.1]hept-5-en-2,3-dicarboxylate and then with 38.5 grams of butoxydiethylene glycol. The urethane polymer weighed 242.7 grams and it had a reduced viscosity of 0.102 as determined at 30° C. using a 0.5 per cent solution in benzene.

Polymer D — A glass polymerization vessel was charged with 200 ml. of benzene and 128.3 grams of castor oil and two drops of dibutyltin dilaurate were dissolved therein. Over a 10 minute period 80 grams of bis(2-isocyanatoethyl)bicyclo[2.2.1]hept-5-en-2,3-dicarboxylate were added; the temperature rose exothermically and about 40 minutes after this addition was complete it had risen to a maximum of 39°C. The viscous solution was stirred another 20 minutes, 38.5 grams of butoxydiethylene glycol was added thereto, stirred and then left standing overnight at room temperature. The following day the benzene was removed by vacuum distillation. The urethane polymer weighed 249.1 grams and it had a reduced viscosity of 0.103 as determined at 30°C. ° a 0.5 per cent solution in benzene.

Polymer E — Using the procedure described for polymer D, 100 grams of the reaction product of one part of the propylene oxide adduct of glycerol having an average molecular weight of about 260 and two parts of epsilon caprolactone (said reaction product having an average molecular weight of about 800) were reacted with about 88 grams of bis(2-isocyanatoethyl) bicyclo-[2.2.1]hept-5-en-2,3-dicarboxylate and then with 32.3 grams of butanol. The urethane polymer weighed 199.5 grams and it had a reduced viscosity of 0.086 as determined at 30° C. using a 0.5 per cent solution in benzene.

Polymer F — The polyester described in Example 28.

The polymers were used to prepare acetone solutions containing 10 weight per cent of the polymer, one weight per cent dichlorobenzoyl peroxide and one weight per cent benzophenone. Samples of paper were immersed in the acetone solutions and air dried; the dried papers had a polymer retention of 20 weight per cent on the weight of the paper. The impregnated paper samples were exposed to a 50 kilowatt argon swirl-flow plasma arc radiation source for 90 seconds at a distance of two feet. Tensile strengths were measured on the untreated paper, the treated paper prior to irradiation, and the treated paper after irradiation. The tensile strengths were measured on irradiated and unirradiated dry paper samples and wet paper samples that had been immersed in water at 25° C. for 15 minutes. The results are set forth below:

| | Tensile strength, p.s.i.* | | | |
|---|---|---|---|---|
| | Dry | | Wet | |
| Polymer | Not Irrad. | Irrad. | Not Irrad. | Irrad. |
| None, control | 14.5 | — | 1.2 | — |
| A | 10.5 | 17.5 | 1.1 | 6.5 |
| B | 11.5 | 22.0 | 1.3 | 7.9 |
| C | 9.5 | 15.0 | 1.0 | 4.5 |
| D | 11.0 | 16.0 | 1.6 | 6.7 |
| E | 12.0 | 19.5 | 1.2 | 7.2 |
| F | 16.0 | 27.0 | 2.4 | 9.4 |

* Reported in pounds/2 inch strip.

EXAMPLE 15

There were charged to a reaction vessel 245 grams of a polycaprolactone diol having an average molecular weight of about 530 and 45.1 grams of 2-ethoxyethanol and the mixture was heated to 80°C. While stirring, 320.3 grams of di(2-isocyanatoethyl)bicyclo[2.2.1]hept-5-en-2,3-dicarboxylate was added all at once. The temperature rose exothermically to 115° C. and then declined. The reaction mixture was stirred at 80° C. for another 1.5 hours and then 22.8 grams of trimethylolpropane was added in one portion. After stirring for 45 minutes at 100° C. the viscous urethane polymer was cooled; the yield was 620 grams. The polymer was a tacky gum that had an inherent viscosity of 0.145 as determined from a 0.5 weight per cent solution in m-cresol at 30° C.; it can be represented by the formula:

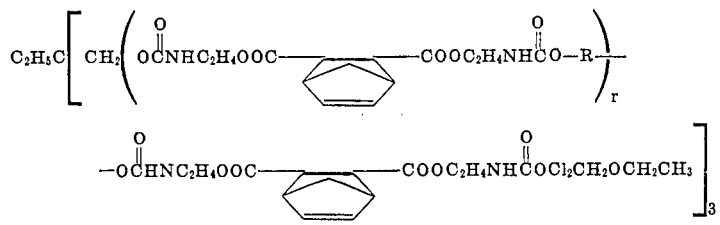

in which R is — [(CH$_2$)$_5$COO]$_m$CH$_2$CH$_2$OCH$_2$CH$_2$[OOC(CH$_2$)$_5$]$_n$ — wherein $m$ and $n$ have an average sum total of about 3.5 and $r$ is an integer.

The polymer was used to produce films 10 mils thick, that were irradiated at a distance of one foot with the light radiation from an argon swirl-flow plasma arc radiation source. In addition, blends of the polymer with one weight per cent of the photosensitizers p-methoxyacetophenone and 3-chloroxanthone were also produced and 10 mils films thereof were similarly irradiated. The films cross-linked and cured to solid hard films after exposure for a matter of seconds. In comparison, a minimum of 25 minutes was necessary to cure the polymers to a hard film when the same compositions were exposed to a 550 watt mercury arc at a distance of one foot. The results are tabulated below:

| Photosensitizer | Cure time to hard film | |
|---|---|---|
| | SFPA, seconds | Hg. arc, minutes |
| None | >30 | 55 |
| p-Methoxyacetophenone | 10 | 25 |
| 3-chloroxanthone | 5 | 55 |

SFPA = Argon swirl-flow plasma arc radiation source.

EXAMPLE 16

In a manner similar to that described in Example 15, a urethane polymer was produced by the reaction of 300 grams of polyethylene glycol having an average molecular weight of about 600, 45.1 grams of 2-ethoxyethanol, 320.3 grams of di(2-isocyanatoethyl) bicyclo[2.2.1]hept-5-en-2,3-dicarboxylate and 22.8 grams of trimethylolpropane. There was recovered 653 grams of a tacky urethane polymer having an inherent viscosity of 0.23 as determined from a 0.5 per cent solution in m-cresol at 30°C. In this polymer the R moiety is represented in the formula shown in Example 15 by the group of the formula —(CH$_2$CH$_2$O)$_x$CH$_2$CH$_2$— wherein $x$ has an average value of about 12.

The polymer was used to produce films, by the procedure in Example 15, and these were cross-linked. It was found that exposure to the argon swirl-flow plasma arc radiation source produced a hard film in a matter of seconds as compared to a much longer period of time required with the mercury arc. The results are tabulated below:

| Photosensitizer | Cure time to hard film | |
|---|---|---|
| | SFPA, seconds | Hg arc, minutes |
| None | >30 * | 40 |
| p-Methoxyacetophenone | 10 | 15 |
| 3-Chloroxanthone | 10 | 20 |

* No cure observed after 30 seconds irradiation.

EXAMPLE 17

In a manner similar to that described in Example 15, a urethane polymer was produced by the reaction of 503.5 grams of polypropylene glycol having an average molecular weight of about 1,025, 45.1 grams of 2-ethoxyethanol, 320.3 grams of di(2-isocyanatoethyl)bicyclo[2.2.1]hept-5-en-2,3-dicarboxylate and 22.8 grams of trimethylolpropane. Two drops of dibutyltindilaurate catalyst were added in the first step of the reaction. There was produced 885.2 grams of a tacky urethane polymer having an inherent viscosity of 0.196 as determined from a 0.5 per cent solution in m-cresol at 30°C. In this polymer the R moiety in the formula shown in Example 15 is represented by the group

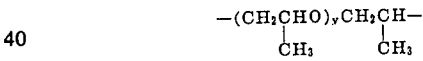

wherein $y$ has an average value of about 16.5.

Films, 10 mils thick, were produced and irradiated as described in Example 15. The argon swirl-flow plasma arc radiation source was much more effective and successfully cured the surface of the film containing the photosensitizers in seconds, whereas the mercury arc failed to cure the polymer in the absence of a photosensitizer or when 3-chloroxanthone was used as the photosensitizer. The polymer blends with the photosensitizers cure to hard films upon continued irradiation. The results are tabulated below:

| Photosensitizer | Cure time to hard film | |
|---|---|---|
| | SFPA, seconds | Hg arc, minutes |
| None | 30 [1] | None after 60 min. |
| p-Methoxyacetophenone | 2 10 | 45 [1]. |
| 3-chloroxanthone | 2 10 | None after 60 min. |

[1] No cure observed after 30 seconds irradiation.
[2] Surface cure.

EXAMPLE 18

A mixture of 600 grams of polyethylene glycol having an average molecular weight of about 600 and 7.5 grams of 2-ethoxy-ethanol was reacted with 320.3 grams of di(2-isocyanatoethyl) bicyclo[2.2.1]hept-5-en-2,3-dicarboxylate as described in Example 15. The exotherm temperature reached was about 129°C. After stirring for one hour at 80° C., another 7.5 grams of 2-ethoxyethanol were added and stirring was continued for 30 minutes at 80° C. The yield was 899.6 grams of a tacky urethane polymer having an inherent viscosity of 0.51 as determined from a 0.5 per cent solution in m-cresol at 30°C. The polymer can be represented by the general formula set forth in which $r$ is an integer.

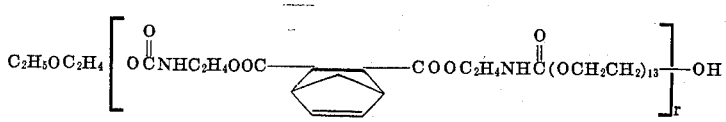

Films, 10 mils thick, were produced from the tacky polymer and irradiated as described in Example 15. The argon swirl-flow plasma arc radiation source was much more effective, with or without added photosensitizers, than was the mercury arc in curing and cross-linking the polymer. The results are tabulated below:

| Photosensitizer | Cure time to hard film | |
|---|---|---|
|  | SFPA, seconds | Hg arc, minutes |
| None | >30 | 30 |
| p-Methoxyacetophenone | 5–10 | 15 |
| 3-chloroxanthone | 10 | 15 |

EXAMPLE 19

A mixture of 4,100 grams of bicyclo[2.2.1]hept-5-en-2,3-dicarboxylic acid anhydride, 5,400 grams of 2,2-dimethyl-3-hydroxypropyl 2,2-dimethyl-3-hydroxypropionate and 240 grams of pentaerythritol was polymerized by heating at 200°C. until the polyester had an acid number of 10.4. The polyester had a reduced viscosity of 0.072 at 30° C. using a 0.2 per cent benzene solution.

The polyester was used to produce 100 per cent solids coating compositions by mixing 70 parts of the liquid polyester with 30 parts of various acrylate monomers, by weight. To portions of each of the coating compositions produced there was also added one weight per cent of various photosensitizers. The 100 per cent solids coating compositions were coated on glass and exposed to the light radiation from an argon swirl-flow plasma arc radiation source at a distance of one foot from the arc. The compositions cross-linked and cured to films with a 10 second exposure to the light radiation. In the table that follows, the diacrylate monomer used is shown in the first column and in the right hand columns the properties of the irradiated films produced with the compositions containing the different photosensitizers is indicated.

stripped off the glass surface. The extent of cross-linking or cure was determined by extraction with boiling acetone to constant weight and calculation of the per cent insoluble polymer remaining. The results are tabulated below:

| | Percent Insoluble | |
|---|---|---|
| Exposure time, min. Monomer | 1 | 2 |
| 2-Butoxyethyl acrylate | 57.6 | 75.1 |
| 2-Phenoxyethyl acrylate | 7.7 | 26.6 |
| 2-Ethylhexyl acrylate | 43.4 | 71.9 |
| 2-Phenylethyl acrylate | 30.4 | 48.9 |
| Furfuryl acrylate | 11.8 | 23.4 |
| Bicyclo[2.2.1]hept-5-en-2-ylmethyl acrylate | 35.0 | 51.8 |
| Dicyclopentenyl acrylate | 50.3 | 66.0 |
| 2-Dicyclopentenoxyethyl acrylate | 13.9 | 47.2 |
| 6-Dicyclopentenoxyhexyl acrylate | 11.3 | 33.3 |
| Bicyclo[2.2.1]hept-5-en-2-ylmethyl methacrylate | 2.3 | 42.7 |
| Butanediol diacrylate | 72.5 | 75.8 |
| Pentanediol diacrylate | 62.9 | 73.3 |
| Neopentyldiol diacrylate | 63.4 | 73.3 |
| 2-Methyl-2-ethylpropanediol diacrylate | 65.5 | 73.0 |
| Polyethyleneglycol(M.W.200) dimethacrylate | 43.6 | 48.5 |
| Styrene | 8.3 | 23.5 |

EXAMPLE 21

A commercially available copolymer of ethyl acrylate (60)/methyl methacrylate (39)/acrylic acid (1) was blended with acrylate monomers to produce two different 100 per cent solids coating compositions. The liquid coating compositions

| Acrylate Monomer | Film property | | | | |
|---|---|---|---|---|---|
|  | Photosensitizer present | | | | |
|  | None | A | B | C | D |
| Bicyclo[2.2.1]hept-5-en-2-ylmethyl acrylate | Gel | Gel | Gel | Gel |  |
| Neopentyl glycol diacrylate | Hard | Hard(²) | Hard | Soft |  |
| Tetremethylene glycol diacrylate |  | Gel | Gel | (³) |  |
| 2-methyl-2-ethyl-1,3-propanediol diacrylate | Hard | Hard | Hard |  | Hard ². |
| Pentamethyleneglycol diacrylate | Soft | Hard | Hard |  | Hard. |
| Polyethylene glycol ¹ diacrylate | Soft | Soft | Soft |  | Soft. |
| 2-butoxyethyl acrylate ⁴ | (³) |  | Soft |  | Soft. |

¹ Average molecular weight of about 200.
² After irradiation for five seconds.
³ Surface cured.
⁴ Composition contained 75% polyester and 25% of the acrylate monomer.
A = 3-chloroxanthone.
B = p-methoxybenzophenone.
C = p-methoxyacetophenone.
D = Benzophenone.

EXAMPLE 20

The same polyester described in Example 19 was mixed with various unsaturated monomers to produce coating compositions containing 70 weight per cent polyester and 30 weight per cent monomer. The liquid solutions were cast onto glass slides to a thickness of about five mils and irradiated for one and two minutes with the light radiation from a 50 kilowatt argon swirl-flow plasma arc radiation source at a distance of two feet from the arc. The liquid coating compositions cured to solid, self-supporting films that could be were used to cast five mil liquid films on a glass surface and the coatings were irradiated for two minutes, at a distance of two feet, with the light radiation from an argon swirl-flow plasma arc radiation source. The coatings cross-linked and cured to solid, self-supporting films that could be stripped off the glass surface. The extent of cross-linking or cure was determined by extraction with boiling benzene to constant weight and calculating the per cent of gelled or insoluble polymer remaining. The two compositions prepared and the per cent insoluble polymer after irradiation are set forth below:

| Composition | | Insoluble, % |
|---|---|---|
| Acrylate copolymer | 30% | |
| Dicyclopentadienyl acrylate | 35% | |
| 2-Butoxyethyl acrylate | 25% | 47.7 |
| Polyethyleneglycol (m.W. 200) acrylate | 10% | |
| Acrylate copolymer | 30% | |
| Dicyclopentadienyl acrylate | 35% | |
| 2-Butoxyethyl acrylate | 25% | 53.3 |
| Butanediol diacrylate | 10% | |

EXAMPLE 22

A 100 per cent solids coating composition was produced containing 30 per cent of a lauryl methacrylate (95)/bicyclo[2.2.1]-hept-5-en-2-ylmethyl acrylate (5) copolymer, 35 per cent dicyclopentadienyl acrylate, 25 per cent 2-butoxyethyl acrylate and 10 per cent polyethylene glycol (M.W. 200) diacrylate. Films thereof cast on glass, irradiated as described in Example 22, cross-linked to the extent that 75.7 per cent of the irradiated polymer was insoluble in boiling benzene.

The lauryl methacrylate/bicyclo[2.2.1]hept-5-en-2-ylmethylacrylate copolymer was produced by charging 12 grams of bicyclo[2.2.1]hept-5-en-2-ylmethyl acrylate, 228 grams of lauryl methacrylate, 120 grams of benzene, 120 grams of toluene and 3.2 grams of t-butyl peroxypivalate to a Pyrex pressure reactor. The polymerization was carried out at 40° C. for about 66.5 hours. The copolymer was precipitated by pouring the reaction mixture into methanol, it was washed in methanol and vacuum dried at 50°C. The yield was 93.3 per cent and the resin was completely soluble in cyclohexane.

EXAMPLE 23

The same polyester described in Example 19 was blended with varying amounts of neopentylglycol diacrylate and the resulting liquid coating compositions were cast into 10 mil liquid films on a glass surface. The liquid films were irradiated for various times at a distance of two feet under a 50 kilowatt argon swirl-flow plasma arc radiation source. In one series the liquid coating compositions contained no photosensitizer and in the other series the compositions were sensitized with one weight per cent benzil as the photosensitizer. The series included radiation of the monomer alone, without the presence of the polyester. In all instances, solid, hard films were produced after irradiation. The extent of curing or cross-linked polymer produced after the irradiation was determined on the films by extraction of the irradiated polymer with boiling benzene to constant weight to determine the amount of insoluble cross-linked polymer remaining. The data shows that not only is this irradiation process useful for cross-linking polymer compositions but it is also useful for rapidly polymerizing monomers to solid polymeric compositions.

| % Neopentylglycol Diacrylate | % Insoluble at various times (seconds) | | | | | | | |
|---|---|---|---|---|---|---|---|---|
| | Unsensitized | | | | Sensitized | | | |
| | 15 | 30 | 60 | 120 | 15 | 30 | 60 | 120 |
| 10 | 31 | 38 | — | 47 | 24 | 41 | 46 | 52 |
| 20 | 49 | 48 | 54 | 58 | — | 47 | 52 | 67 |
| 25 | 48 | 57 | 64 | 56 | 39 | 41 | 54 | 56 |
| 35 | 61 | 64 | 70 | 75 | 60 | 63 | 68 | 71 |
| 40 | 62 | 64 | 73 | 77 | 63 | 64 | 71 | 77 |
| 50 | 58 | 68 | 74 | 83 | 65 | 69 | 87 | 81 |
| 60 | 61 | 65 | 73 | 93 | 66 | 76 | 89 | 89 |
| 80 | 0 | 0 | 75 | 93 | 32 | 74 | 94 | 96 |
| 100 | 0 | 0 | 25 | 98 | 12 | 67 | 82 | 99 |

EXAMPLE 24

The polyester described in Example 19 was blended with varying amounts of 2-butoxyethyl acrylate and the liquid compositions were cast on glass surfaces to form 10 mils thick films. The liquid films were irradiated at a distance of two feet with a 50 kilowatt argon swirl-flow plasma arc radiation source. In one series the 100 per cent solids coating compositions contained no photosensitizer and in the other series the compositions were sensitized with one weight per cent benzil as the photosensitizer. In addition, the monomer alone was subjected to irradiation. The extent of cross-linking or cross-linked polymer produced in the polymerization was determined on the solid films in the manner described in Example 23. The data is set forth below:

| % Butyl Cellosolve Acrylate | % Insoluble at various times (seconds) | | | | | | | |
|---|---|---|---|---|---|---|---|---|
| | Unsensitized | | | | Sensitized | | | |
| | 15 | 30 | 60 | 120 | 15 | 30 | 60 | 120 |
| 10 | 21 | 35 | 37 | 22 | 30 | 23 | 24 | 49 |
| 20 | 29 | 35 | 42 | 46 | 32 | 46 | 57 | 64 |
| 25 | 22 | 36 | 39 | 51 | 26 | — | 59 | 61 |
| 30 | 23 | 35 | 43 | 60 | 43 | 57 | — | 71 |
| 35 | 30 | 35 | 46 | 60 | 26 | 54 | 54 | 74 |
| 40 | 27 | 32 | 50 | 56 | 30 | 59 | 58 | 66 |
| 50 | 17 | 34 | 62 | 56 | 32 | 87 | 82 | 68 |
| 60 | 18 | 40 | 64 | 68 | 17 | 40 | 58 | 65 |
| 80 | 31 | 67 | 68 | 61 | 23 | 45 | 60 | 72 |
| 100 | 0 | 0 | — | 35 | 0 | 21 | 25 | 44 |

EXAMPLE 25

A 100 per cent solids coating composition was produced containing 70 weight per cent of the polyester of Example 19 and 30 weight per cent of neopentyl glycol diacrylate. The composition was blended with various photosensitizers and initiators, as a concentration of one weight per cent each, and the liquid sensitized solutions were cast as 10 mils thick films on glass plates. The liquid films were irradiated for 20 seconds, at a distance of one foot, under a 50 kilowatt argon swirl-flow plasma arc radiation source. After exposure the films were hard and solid; they were extracted to constant weight with boiling benzene and the amount of cross-linked polymer formed was determined by the amount of insoluble polymer remaining. The results are tabulated below:

| Photosensitizer | Insoluble Polymer, % |
|---|---|
| Benzophenone | 74 |
| Benzophenone + benzoyl peroxide | 68 |
| Benzophenone + dichlorobenzoyl peroxide | 73 |
| p-Methoxybenzophenone | 70 |
| p-Methoxybenzophenone plus benzoyl peroxide | 73 |
| p-Methoxybenzophenone plus dichlorobenzoyl peroxide | 75 |
| Benzil | 76 |
| Benzil plus benzoyl peroxide | 78 |
| Benzoyl peroxide | 79 |
| Dichlorobenzoyl peroxide | 77 |

EXAMPLE 26

A series of compositions was produced and used to impregnate paper sheets to a weight pickup of 20 per cent. The impregnated papers were then irradiated and cured for 90 seconds at a distance of two feet from a 50 kilowatt argon swirl-flow plasma arc radiation source. The tensile strengths were measured on the cured and uncured samples in the dry state and in the wet state after a 15 minute immersion in water at 25° C. The contents of each composition and the properties of the control paper samples are set forth below.

Composition A was a 100 per cent solids coating composition containing 70 parts by weight of the polyester of bicyclo-[2.2.1]hapt-2-en-5,6-dicarboxylic acid anhydride and 3-hydroxyneopentyl 3-hydroxypivalate, 30 parts of 2-butoxyethyl acrylate, one part dichlorobenzoyl peroxide and one part benzophenone.

Composition B was a 100 per cent solids coating composition containing 50 parts of the same polyester used in composition A, 45 parts of a 2-butoxyethyl acrylate, five parts of neopentyl glycol diacrylate, one part dichlorobenzoyl peroxide and one part benzophenone.

Composition C contained 95 parts of 2-butoxyethyl acrylate, five parts of neopentyl glycol diacrylate, one part of dichlorobenzoyl peroxide and one part of benzophenone.

| Composition | Tensile strength, p.s.i.* | | | |
|---|---|---|---|---|
| | Dry | | Wet | |
| | Not Irrad. | Irrad. | Not Irrad. | Irrad. |
| None, control | 14.5 | | 1.2 | |
| A | 14.5 | 28.0 | 2.8 | 9.4 |
| B | 15.5 | 25.0 | 1.7 | 9.0 |
| C | 13.5 | 12.0 | 1.2 | 4.2 |

*Reported in pounds/2inch strip

EXAMPLE 27

A polyester was produced by reacting 4,100 parts of bicyclo[2.2.1]hept-2-en-5,6-dicarboxylic acid anhydride, 5,400 parts of 2,2-dimethyl-3-hydroxypropyl 2,2-dimethyl-3-hydroxypropionate and 240 parts of pentaerythritol at 200° C. until the solution had an acid number of 10.4. The reduced viscosity of the polyester was 0.072 as determined at 30° C. from a 0.2 per cent solution in benzene. About 70 parts by weight of the polyester, 17 parts of 2-butoxyethyl acrylate and 13 parts of neopentyl glycol diacrylate were mixed in a flask and about 3.2 parts of bis(2-isocyanatoethyl) 5-norbornene-2,3-dicarboxylate were slowly added in a dropwise manner while maintaining a temperature of about 80° C. The reaction mixture was stirred until infrared analysis had indicated that all of the isocyanate groups had reacted. A five mils thick film cast on a glass plate curd to a hard film on exposure to the light radiation from a swirl-flow plasma arc radiation source at a distance of two feet from the arc. The addition of various photosensitizers and pigments shortened the exposure time needed to cure the polymer compositions to hard films; these blends were exposed at a distance of one foot from the arc. The results are tabulated below:

| Run | Additives | Time, sec. |
|---|---|---|
| a | None | 20 |
| b | Benzil, 1% | 1 |
| c | Benzophenone, 1% | 1 |
| d | Benzophenone, 1% Dichlorobenzoyl peroxide, 1% | 0.4 |
| e | Benzil, 1% Dichlorobenzoyl peroxide, 1% Naphthol Red, 30%(Color Ind ex 16185) | 5 |
| f | Benzophenone, 1% Dichlorobenzoyl peroxide, 1% Naphthol Red, 30% | 5 |
| g | Benzil, 1% Dichlorobenzoyl peroxide, 1% Titanium dioxide, 30% | 5 |
| h | Fluorenone, 1% Dichlorobenzoyl peroxide, 1% Titanium dioxide, 30% | 3 |

EXAMPLE 28

A series of 100 per cent solids coating compositions was prepared containing 40 weight per cent of 2-butozyethyl acrylate and 60 weight per cent of a norbornene-containing urethane polymer. In addition, blends of the coating compositions with one weight per cent of various photosensitizers were prepared. The liquid compositions were cast on glass plates to produce liquid films five mils thick that were irradiated for various times at a distance of two feet from the arc with a 50 kilowatt swirl-flow plasma arc radiation source. In all instances cross-linking was achieved, as shown by the data tabulated below. The urethane polymers were as follows:

Polymer A—Polymer described in Example 15.
Polymer B—Polymer described in Example 16.
Polymer C—Polymer described in Example 18.
Polymer D—Polymer described in Example 17.

| Urethane Polymer | Photosensitizer | Exposure time (sec.) | | |
|---|---|---|---|---|
| | | 30 | 60 | 120 |
| A | None | — | Surface Cure | Cured |
| | Propiophenone | — | Surface Cure | Cured |
| | p-Methoxybenzophenone | — | Surface Cure | Hard Film |
| | 3-Chlorozanthone | Surface Cure | Hard Film | — |
| B | None | — | Surface cure | Cured |
| | Propiophenone | — | Surface cure | Cured |
| | p-Methoxybenzophenone | — | Hard Film | — |
| C | None | — | Surface cure | Cured |
| | Propiophenone | — | Surface cure | Cured |
| | p-Methoxybenzophenone | — | Cured | Hard Film |
| | 3-Chloroxanthone | Surface Cure | Hard Film | — |
| D | None | None | None | Surface cure |
| | p-Methoxybenzophenone | None | Surface cure | Surface cure |

EXAMPLE 29

Five moles of maleic anhydride were placed in a reaction flask equipped with a stirrer, thermometer, nitrogen purge tube, and a water condenser connected to a dry ice cold trap. The anhydride was melted by heating and at 125° C. to 150° C. 1,385 moles of bromine were slowly added. The mixture was cooled to 50° C., the water condenser and one mole of phthalic anhydride and 6.8 moles of ethylene glycol were added. The reaction mixture was stirred at 170° C. to 175° C. for about six hours while continuously bubbling nitrogen through the molten mass. The polyester had an acid number of about 50–60. At 150° C., 0.02 per cent hydroquinone inhibitor was added to the polyester and at 100° C. styrene was added to give a 30 per cent styrene solution. This 100 per cent solids coating composition was cast into films 20 mils thick and irradiated at a distance of two feet with the light radiation from a 50 kilowatt swirl-flow plasma arc radiation source. In addition, films produced from the same polyester blended with 0.1 per cent of various photosensitizers were similarly irradiated and cross-linked. In all instances the liquid coating composition cured to a solid film; the results are tabulated below.

| Additive | Exposure time, seconds | Film properties |
|---|---|---|
| None | 120 | Clear, rubbery brittle |
| Methylene blue (C.I. No. 52015) | 120 | Hard |
| Ethyl eosin (C.I. No. 45386) | 90 | Hard |
| Acridine orange (C.I. No. 46005) | 90 | Hard |

EXAMPLE 30

A commercially available polyester produced by the reaction of two moles of propylene glycol, one more of maleic anhydride and one mole of dimethylterephthalate and having a Brookfield viscosity of 450,000 was used. Seventy parts of the polyester were dissolved in 30 parts of styrene to produce a 100 per cent solids coating composition. Portions of this composition were blended with 0.1 per cent of various photosensitizers. The solutions were used to cast liquid films 20 mils thick on glass plates. The films were irradiated at a distance of two feet with the light radiation from a 50 kilowatt argon swirl-flow plasma arc radiation source. In all instances the liquid coatings cured to solid films.

| Additive | Exposure time, Seconds | Film properties |
| --- | --- | --- |
| None | 120 | Clear, rubbery brittle |
| Methylene blue | 120 | Hard |
| Ethyl eosin | 20 | Hard, brittle |
| Acridine orange | 90 | Hard, brittle |

EXAMPLE 31

Electrical conductors were produced with two different polyethylenes and two different metal conductors. Two copper wire conductors were produced using 14 CA copper wire, the first was insulated with a 30 mils covering of a polyethylene having a density of 0.918 g./cc. and a melt index of 0.108 dgm./min. (Conductor A) and the second was insulated with a polyethylene having a density of 0.945 g./cc. and a melt index of 0.2 dgm/minute (Conductor B). Two No.4, 15 kilovolt sodium conductors were also prepared with 220 mils thick insulations using the same polyethylenes. The sodium conductor using the low density polymer is Conductor C and the sodium conductor using the high density polymer is Conductor D.

The insulated copper wires were irradiated by passing the wires continuously in a reflection chamber at a distance of about two to three inches from the arc and at a speed of 1.25 feet per minute through the light radiation from a 30 kilowatt argon swirl-flow plasma arc radiation source. The insulated wire became heated to about 95° C.

The insulated sodium cables were similarly irradiated except that they were passed through the light radiation zone four times at a speed of five feet per minute. The insulated cable heated to about 50° to 60° C.

The extent of cross-linking or per cent gel is the average of at least two determinations and was determined by stripping the insulation from the conductor and extracting with hot decalin to constant weight. The deformation under load was determined and the results are summarized below:

| Conductor | Gel % | Deformation under load, % |
| --- | --- | --- |
| A | 66 | |
| B | 73 | −1.5 |
| C | 16 | |
| D | 7.5 | |
| Control, low density | 0 | melted |
| Control, high density | 0 | 2.6 |

The copper wire conductors were also tested for flame resistance. The ends of the irradiated and unirradiated copper wire conductors were placed in a match flame. The insulation on the irradiated copper wire conductors glowed but it did not shrink or drip. The insulation on the control unirradiated copper wire conductors shrunk and dripped.

EXAMPLE 32

The process was used to treat fabrics to improve the crease resistance. A 35/65 cotton/polyester and a cotton fabric were padded to 65 per cent wet pick up with the following solution in a conventional padding bath:

| | |
| --- | --- |
| N-Methylolacrylamide | 9 parts (by weight) |
| Zinc nitrate solution | 2 parts |
| Reaction product of a $C_{18}$ linear secondary alcohol and 9 moles of ethylene oxide | 0.01 part |
| Distilled water | 89 parts |
| p-Methoxybenzophenone | 0.1 part |

The padded fabric samples were mounted on conventional tenter frames and dried in a forced air oven at 200° F. for three minutes. Two methods were used for curing each sample.

Method A—The mounted fabric was irradiated at a distance of two feet with the light radiation from a 50 kilowatt argon swirl-flow plasma arc radiation source for 15 seconds and then placed in a forced air oven at 310° F. for 15 minutes.

Method B—The mounted fabric was given the same treatment but in reverse order.

Each fabric sample was then washed and dried in conventional laundry equipment using "Tide" detergent and then evaluated. The Monsanto Wrinkle Recovery test is AATCC Method No. 66-1659T; the Durable Press Ratings were determined by AATCC Method No. 124-1967T and the Tensile Strength by ASTM Method No. D1682-59T.

| Fabric | Monsanto Wrinkle Recovery | Durable Press Rating | Tensile Strength p.s.i. |
| --- | --- | --- | --- |
| Cotton, untreated | 160° | | 52 |
| Method A | 261° | | 28 |
| Method B | 263° | | 29 |
| Cotton/polyester untreated | | 2.7 | |
| Method A | | 3.8 | |
| Method B | | 4.0 | |

EXAMPLE 33

A 100 per cent solids coating composition was produced using 70 parts of the polyester of Example 19, 20 parts of 2-ethylhexyl acrylate and 10 parts of neopentylglycol diacrylate. The composition was blended with various photosensitizers and initiators and three mils thick coatings on steel panels were exposed to the light radiation from a 50 kilowatt argon swirl-flow plasma arc radiation source at a distance of two feet in a nitrogen atmosphere. It was found that adhesion was excellent in all instances and that the combination of additives gave a much better film coating.

| Run | Additive | Exposure time, sec. | Surface | Sward Hardness |
| --- | --- | --- | --- | --- |
| a | None | 40 | W | |
| b | TEOA, 1% | 40 | W | |
| c | BP, 5%* | 30 | W | |
| d | 1% TEOA, 5% BP | 20 | S | 8 |
| e | 1% TEOA, 5% BP | 30 | S | 20 |
| f | 1% TEOA, 5% BP | 40 | S | 32 |
| g | 1% TEOA, 5% BP | 50 | S | 42 |
| h | 1% TEOA, 2% F | 20 | S | 0 |
| i | 1% TEOA, 2% F | 30 | S | 4 |
| j | 1% TEOA, 2% F | 40 | S | 10 |
| k | 1% TEOA, 2% F | 50 | S | 12 |

TEOA — Triethanolamine
BP — Benzophenone
F — fluorenone
W — wrinkled
S — smooth

EXAMPLE 34

A 100 per cent solids coating composition was produced using 70 parts of the polyester of Example 19, 22.5 parts of 2-ethylhexyl acrylate and 7.5 parts of neopentylglycol diacrylate. The composition was blended with various photosensitizers and initiators and three mils thick coatings on steel panels were exposed to radiation as described in Example 33. Adhesion was excellent except when benzoin was used as the photosensitizer; in all instances the surface was smooth.

| Run | Additive | Exposure time, sec. | Sward Hardness |
|---|---|---|---|
| a | 1% TEOA, 1% BE | 20 | 2 |
| b | 1% TEOA, 1% BE | 30 | 10 |
| c | 1% TEOA, 0.5% BEN | 20 | 6 |
| d | 1% TEOA, 0.5% BEN | 30 | 10 |
| e | 1% TEOA, .5% BP | 20 | 8 |
| f | 1% TEOA, .5% BP | 30 | 20 |
| g | 1% TEOA, .5% BP | 20* | 6 |
| h | 1% TEOA, 0.5% BE | 20* | 6 |
| i | 1% TEOA, 0.5% BE | 40* | 10 |
| j | 1% TEOA, 0.5% BE | 30 | 10 |
| TEOA | — triethanolamine | | |
| BP | — benzophenone | | |
| BE | — benzil | | |
| BEN | — benzoin | | |

* — radiated in air

EXAMPLE 35

A 100 per cent solids coating composition was prepared by dissolving 30 g. of poly(methyl methacrylate) having a reduced viscosity of 0.38 using a 0.5 weight per cent benzene solution in a mixture of 52.5 g. of 2-butoxyethyl acrylate, 12.5 g. of neopentyl glycol diacrylate, five g. of 5-norbornen-2-yl-methyl 5-norbornene-2-carboxylate and three g. of benzil. The coating was then applied to Bonderite No. 37 steel sheets with a wire-wound rod so as to apply a wet film of 0.5 mil thickness. The coated panel was exposed to the high intensity predominantly continuum light radiation from a 50-kilowatt argon swirl-flow plasma arc at a distance of two feet for a period of five seconds. The cured coating exhibited a Sward hardness of 22 and a reverse impact of 150 inch-pounds.

EXAMPLE 36

A solution of 100 grams of a poly-epsilon-caprolactone triol having an average molecular weight of about 800, 200 ml. of benzene and two drops of dibutyltin dilaurate was charged to a one-liter resin kettle equipped with motor-driven blade stirrer, reflux condenser, dropping funnel and thermocouple inlet. The poly-epsilon-caprolactone triol was produced by the reaction of epsilon-caprolactone with the adduct of glycerol and three moles of ethylene oxide. With stirring and under a slight positive pressure of nitrogen, 88.03 grams of bis(2-isocyanatoethyl) 5-norbornene-2,3-dicarboxylate were added over a period of twenty minutes while maintaining a temperature of 20° C. by means of an external ice bath. Stirring was continued for 4.5 hours at 20° C., 32.3 grams of n-butanol were then added, and the reaction mixture was allowed to stir overnight (16 hours). The temperature was raised to 100° C. and the remaining low boiling components were removed in vacuo. The resin was then purged with nitrogen and dumped, yielding 199.5 g. of viscous, sticky material. Reduced viscosity of the urethane polymer in benzene (0.5 percent solution at 30° C.) was 0.086, while in N,N-dimethylformamide (0.5 percent solution at 30° C.) it was 0.188.

Thirty-five grams of the urethane resin described above was mixed with 15 grams neopentyl glycol diacrylate to form a fluid solution. The material was applied as a 1-mil wet film to a Bonderite No. 37 steel panel. Exposure of the coated panel to the high intensity predominantly continuum light radiation from a 50-kilowatt argon swirl-flow plasma arc for 20 seconds at a distance of two feet from the arc produced a cured finish. The coating showed an impact resistance greater than 165 pounds per inch, excellent crosshatch adhesion and steam resistance.

EXAMPLE 37

A silicone-modified polyester resin was prepared by reacting 143.9 grams of neopentyl glycol, 84.7 grams of maleic anhydride, 60 grams of xylene, and 214.9 grams of a methoxy-capped linear phenyl- and methyl-substituted siloxane of average mw. 450 (214.85 g.). The mixture was placed in a one-liter resin kettle equipped with motor-driven blade stirrer, six-inch distillation column, dropping funnel and thermocouple and stirred under reflux, removing a total of 30 ml. of methanol and then 24 ml. of water over a period of 12 hours. During that time the kettle temperature was raised to a maximum 190±5° C. The siloxane polymer was the reaction product of equimolar amounts of dimethyldichlorosilane, diphenyltrichlorosilane and water, capped with methanol. After removal of the water, the still column was replaced with an acetone/dry-ice condenser, and 114.2 grams of dicyclopentadiene were added dropwise over a period of three hours at a kettle temperature of 190° C. The temperature was then lowered to 150±10° C., and the excess mono- and/or dicyclopentadiene was removed in vacuo with a nitrogen purge. A total of 400.7 g. of the silicone-modified polyester resin remained. The material had a reduced viscosity in benzene (0.5 percent solution at 30° C.) of 0.045. Analysis by infrared and nuclear magnetic resonance spectroscopy indicated that essentially all double bonds were of the norbornene type. Fifteen grams of the silicone-polyester described above were dissolved in a solution of 8.94 g. of 2-ethylhexyl acrylate, 1.06 g. of neopentyl glycol diacrylate and 0.75 g. of benzophenone. A wet film of 0.3 mil thickness was applied to a Bonderite No. 37 steel panel with a wire-wound rod, and the panel was exposed to the high intensity predominantly continuum light radiation from a 50-kilowatt argon swirl-flow plasma arc at a distance of two feet. The cured coating exhibited the properties listed below:

| Exposure | Coating |
|---|---|
| | 25 sec. |
| Sward hardness | 12 |
| Impact | |
| Front | >165 |
| Reverse | 100 |
| Adhesion, crosshatch | Excellent |
| Boiling water | |
| Resistance | Good |
| Adhesion | Excellent |

Example 38

A series of polymers was produced by preparing solutions of five grams of the vinyl monomers shown in the following table with various photoinitiators. Each solution was placed in an aluminum cup and irradiated with light from (1) a 550 watt mercury lamp (one foot under the arc) and (2) the high intensity predominantly continuum light radiation from an argon swirl-flow plasma arc (two feet under arc). Irradiation was discontinued when the monomer polymerized to the extent that it was no longer fluid, the time needed was recorded as the Exposure Time.

| Monomer | Additive | Light Source | Exposure time (sec.) |
|---|---|---|---|
| 2-butyoxyethyl acrylate | None | Mercury arc | (1) |
| Do | 3 wt. percent benzophenone | do | 200 |
| Do | do | Swirl-flow plasma arc | 60 |
| Do | 3% benzophenone plus 2.0% methyl diethanolamine | Mercury arc | 60 |
| Do | do | Swirl-flow plasma arc | 25 |

Table – Continued

| Monomer | Additive | Light Source | Exposure time (sec.) |
|---|---|---|---|
| Neopentylglycol diacrylate | None | Mercury arc | (2) |
| Do | 3% benzophenone | do | 60 |
| Do | 3% benzophenone plus 2.0% methyl diethanolamine | do | 20 |
| Do | do | Swirl-flow plasma arc | 3 |
| 2-ethylhexylacrylate | None | Swirl-flow plasma arc | (3) |
| Do | 3% benzophenone plus 2% methyl diethanolamine | do | 20 |
| | | do | 20 |
| 2-methoxyethyl acrylate | 3% benzophenone plus 2% methyl diethanolamine | Swirl-flow plasma arc | 3 |

[1] No polymer after 10 minutes.
[2] No polymer.
[3] None, monomer boiled out.

Example 39

A padding bath was prepared by dissolving 83.3 grams of 60 percent aqueous N-methylol-acrylamide (50g. contained), 15 grams of zinc nitrate as catalyst, and 0.5 gram of a surfactant which was the reaction product of a $C_{15}$ linear secondary alcohol and nine mols of ethylene oxide in sufficient water to make up a 500 gram solution. Five swatches of 15-inch by 18-inch cotton broadcloth were padded with the solution and passed through a wringer calibrated so that the padded swatches increased 65 percent by weight by pickup of the solution. The swatches were then placed on pin frames and exposed to the high intensity predominantly continuum light radiation from a 50-kilowatt argon swirl-flow plasma arc at a distance of two feet. Exposure times were 1,3,5,10 and 20 seconds. The samples were dried at 200° C. for two minutes in a forced air oven and then cured at 320° C. for five minutes. The degree of durable press imparted by this treatment was measured by the Monsanto Wrinkle Recovery Angle Test (AATCC No. 66-1959T).

| Exposure Time (Seconds) | MWRA (Warp plus fill) |
|---|---|
| 1 | 223 |
| 3 | 263 |
| 5 | 262 |
| 10 | 270 |
| 20 | 267 |

The untreated cotton has a MWRA of only 160°.

EXAMPLE 40

One hundred parts of a commercially available polyisochloroprene rubber having an average molecular weight of about 350,000 was blended on a roll mill with 0.3 part of benzophenone and 0.5 part of ethyl eosin. The blend was formed into six inches square placques having a thickness of 75 mils. The squares were irradiated to the high intensity predominantly continuum light radiation from a 50-kilowatt argon swirl-flow plasma arc at a distance of two feet from the arc. The extent of cross-linking or cure was determined qualitatively by immersing nine mm. circles cut from the squares in about 110 ml. of toluene for a period of 96 hours at room temperature. At the end of this period, the contents of the containers were filtered through a 200 mesh screen and the polymer remaining on the screen was evaluated visually. The unirradiated rubber completely dissolved. The rubber samples that were exposed to the high intensity predominantly continuum light radiation had cross-linked and the extent thereof was dependent on the radiation period. The degree of cross-linking was estimated from the amount of cured rubber remaining on the screen. The circle irradiated for 30 seconds yielded a small amount of a loose, coherent, deformed gel. The circle irradiated for 90 seconds retained its circular shape and exhibited a skin effect, indicative of appreciable cross-linking. The circle irradiated for 120 seconds had a well defined circular form and a strong skin, indicative of a high level of cross-linking.

The process of this invention can also be used to coat wires, such as magnet wire. The coating of wires has long been known, it generally involves the passage of the wire through a coating bath followed by steps to dry the coating on the wire. It is important that the coating be continuous and free of holes. In the instant application, a wire can be coated by passage through an appropriate coating bath containing a crosslinkable polymer, a polymerizable monomer, or a mixture thereof, said bath optionally containing fillers, dyes, and other known additives and diluents or solvents. The coated wire is then exposed to the high intensity predominantly continuum light radiation and cured to a solid coating. This process may be repeated as many times as is necessary to obtain the desired coating thickness.

EXAMPLE 41

A total of 16.5 parts by weight of an 80/20 mixture of 2,4- and 2,6-tolylenediisocyanate was gradually added with continuous agitation to a solution of 16.3 parts by weight polyepsilon-caprolactone triol of average molecular weight 540 (prepared from polymerization of 1,1,1-trimethylolpropane and epsilon-caprolactone) and 0.05 parts by weight dibutyltin dilaurate such that the temperature did not exceed 60° C. After addition was complete, stirring was continued for four hours at 60° C. Then 10.8 parts by weight of 2-hydroxyethyl acrylate were added, the agitation was continued for an additional six hours at 60° C. The resultant viscous, light-yellow oligomer resin was admixed with the acrylate monomers and photosensitizers designated in the following table in the amounts indicated to produce a series of coating compositions.

| | Parts by weight of oligomer | Parts by weight of acrylate monomer | | | | | | | Parts by weight of sensitizer |
|---|---|---|---|---|---|---|---|---|---|
| | | HEA | BCA | EGDA | *2EHA | NPGDA | DCPA | IDA | |
| Composition: | | | | | | | | | |
| 1 | 45 | 10.0 | 20.0 | | | 20.0 | 5.0 | | 1.5 BMEH |
| 2 | 50 | 10.0 | 20.0 | | | 20.0 | | | 1.5 BME |
| 3 | 50 | 12.5 | | 20.0 | 17.5 | | | | 2.0 BME |
| 4 | 50 | 12.5 | | 20.0 | 17.5 | | | | 5.0 BMTA |
| 5 | 50 | 50 | | | | | | | 5.0 BMTA |
| 6 | 50 | 50 | | | | | | | 2.0 BME |
| 7 | 22.5 | | | | 5.5 | 12.0 | | | 1.5 BME |
| 8 | 22.5 | | | | | 12.0 | | 5.5 | 1.5 BME |
| 9 | 40.0 | 10.0 | | | 25.0 | 25.0 | | | 1.0 BME |
| 10 | 40.0 | 15.0 | | | 20.0 | 25.0 | | | 2.0 BME |
| 11 | 40.0 | 15.0 | | | 20.0 | 25.0 | | | 2.0 T-14 |

HEA = 2-hydroxyethyl acrylate
BCA = butoxyethyl acrylate
EGDA = ethylene glycols diacrylate
2EHA = 2-ethylhexyl acrylate
NPGDA = neopentyl glycol diacrylate
DCPA = dicyclopentenyl acrylate
IDA = isodecyl acrylate
BME = benzoin methyl ether
BMTA = a 2/3 mixture of benzophenone/methyldiethanolamine
T-14 = a commercial mixture of isomeric butyl ethers of benzoin The resultant coating solutions were drawn down on birch-faced plywood (Compositions 1 and 2) or Bonderite No. 37 steel panels (Compositions 3 to 11) with a No. 12 wire-wound rod. The coated panels from Compositions 1 to 9 were exposed to the high intensity predominantly continuum light radiation emanating from a 50-kilowatt argon swirl-flow plasma arc radiation unit; an 80-kilowatt unit was used to treat Compositions 10 and 11. A nitrogen atmosphere containing less than three per cent oxygen was used in the treating chamber. The physical properties of the cured coatings are recorded below:

| Composition: | Exposure (sec.) | Sward hardness | Impact resistance Face | Impact resistance Reverse | Scotch tape adhension, percent |
|---|---|---|---|---|---|
| 1 | 5.6 | | | | 100/100 |
| 2 | 5-6 | | | | 0/100 |
| 3 | 5-6 | 43 | >165 | >165 | 100/100 |
| 4 | 5-6 | 18 | >165 | >165 | 0/100 |
| 5 | 5-6 | 20 | >165 | >165 | 30/30 |
| 6 | 5-6 | 56 | >165 | >165 | 100/100 |
| 7 | 5-6 | 70 | 50 | 10 | 100/40 |
| 8 | 5-6 | 70 | 40 | <5 | 100/100 |
| 9 | 3 | 44 | 110 | 75 | |
| 10 | 0.30 | 20 | >165 | 160 | |
| 11 | 0.30 | 10 | >165 | >165 | |

NOTE.—Two tape tests were carried out, one using 3M #600 tape and one using 3M #250 tape. In both cases the tape was applied to the coating, subjected to a pressure of 125 p.s.i. for 2-3 seconds, then pulled off 24 hours later. The numbers represent percentage of coating under the tape not removed.

Chemical and stain resistance tests were conducted by placing 0.5 ml. of the fluid designated in the following table on the cured panel and then covering with a polyethylene bottle cap for the time indicated to prevent volatilization. The results are recorded in the following table. In all of the tests, a rating of 0 indicates complete removal of staining of the coating; a rating of 10 indicates no visible change.

| | 60 sec. | | Four-hour Exposure | | |
|---|---|---|---|---|---|
| Comp. | Nail Enamel Remover | Black Ink | 20% aqueous NaOH | Mercurochrome 1 | Chlorine Bleach |
| 1 | 10 | 9 | 10 | 10 | 10 |
| 2 | 10 | 10 | 10 | 10 | 10 |
| 3 | 10 | 9 | 10 | 10 | 10 |
| 4 | 5 | 7 | 9 | 5 | 6 |
| 5 | 3 | 0 | 0 | 0 | 0 |
| 6 | 6 | 3 | 0 | 10 | 0 |
| 7 | 10 | 9 | 10 | 10 | 10 |
| 8 | 10 | 9 | 10 | 10 | 10 |
| 9 | 10 | 8 | 10 | 10 | 10 |
| 10 | 8 | 8 | 10 | 10 | 10 |
| 11 | 0 | 8 | 9 | 10 | 10 |

1. Two percent aqueous solution of 2,7-disodiumdibromo-4-hydroxymercurifluoroscein.

EXAMPLE 42

A solution of 700 parts by weight of epoxidized soya oil (seven percent by weight oxirane content), 420 parts by weight of benzene 222 parts by weight of glacial acrylic acid (containing 200 parts per million P-methoxyphenol inhibitor), four parts by weight of hydroquinone, and four parts by weight of tributylamine was agitated under a gentle air purge at 88° C. for 141 hours. After that period 0.035 parts by weight of phenothiazine was added, and the solution was passed through two successive columns 40 inches long and 2.4 inches wide containing a commercially available basic ion exchange resin having dimethylamino groups to remove free acidity. p-Methoxyphenol (0.07 parts by weight) was placed in the receivers under each column. The resultant solution, which showed no free acid as determined by base titration, was treated with two per cent by weight of activated charcoal for one hour at room temperature, then filtered, and the benzene was stripped by steam treatment under 50 mm. pressure. 734 Parts by weight of the triacrylate resin were recovered.

Benzoin methyl ether (1.5 percent by weight) was added to the above resin, and the resulting solution was applied to a Bonderite No. 37 steel panel with a No. 20 wire-wound rod. The coated panel was purged with nitrogen for 20 seconds and then exposed to the light radiation from a 50-kilowatt argon swirl-flow plasma arc radiation source for five seconds at a distance of two feet. The cured coating exhibited a Sward Hardness of 16, a reverse impact resistance of greater than 165 inch-pounds, and excellent resistance to boiling water for 30 minutes. Fifty rubs with a cheesecloth soaked with acetone failed to remove any of the film.

Exposure of an identical coating for one second under comparable conditions provided a cured finish which resisted 50 acetone rubs, boiling water for 30 minutes, and had a reverse impact of greater than 165 inch-pounds. The coating exhibited a Sward Hardness of 10.

EXAMPLE 43

A solution of 50 parts by weight of a commercially available low molecular weight unsaturated polyester produced by the reaction of equimolar amounts of phthalic anhydride and maleic anhydride with propylene glycol, 50 parts by weight of styrene, and two parts by weight of an isomeric mixture of butyl ethers of benzoin was applied to a Bonderite No. 37 steel panel with a No. 20 wire-wound rod. The coated panel was exposed for one second to the high intensity predominantly continuum light radiation from an 80-kilowatt argon swirl-flow plasma arc radiation source at a distance of four feet in an atmosphere containing about 2-3 per cent oxygen and about 97-98 per cent nitrogen. The cured coating exhibited a Sward Hardness of 14, a reverse impact resistance of about five inch-pounds, excellent resistance to boiling water for 30 minutes, and excellent adhesion as measured by scotch tape pull on a razor-applied crosshatch.

EXAMPLE 44

Coatings comprising parts by weight of the materials designated in the following table were mixed, and two parts by weight of a commercially available mixture of isomers of the butyl ethers of benzoin were added to each formulation. Each coating was applied to a Bonderite No. 37 steel panel with a No. 20 wire-wound rod. The coated panels were placed in an atmosphere comprising about 2-3 per cent of oxygen and about 97-98 per cent of nitrogen and exposed to the high intensity predominantly continuum light radiation from an 80-kilowatt argon swirl-flow plasma arc radiation source at a distance of four feet for the duration indicated in the following table. Properties of the cured finishes are recorded in the table.

| Coating | a | b | c | d | e | f | g | h | i | j | k | l | m |
|---|---|---|---|---|---|---|---|---|---|---|---|---|---|
| Resin A | 50 | 50 | 50 | 50 | | | | | | | | 50 | 50 |
| Resin B | | | | | 20 | 20 | | | | | | | |
| Resin C | | | | | | | 20 | 20 | 20 | 20 | 20 | | |
| 2-ethoxyethyl acrylate | 37.5 | | | | | | 40 | 40 | 40 | 40 | 40 | | |
| 2-ethylhexyl acrylate | | 12.5 | | | 20 | 13.3 | 30 | | | | 13.3 | 18.75 | 21.25 |
| 2-hydroxyethyl acrylate | | 25.0 | 37.5 | 16.6 | 20 | 13.3 | | 30 | | 13.3 | | 12.5 | 7.5 |
| 1,4-butanediol diacrylate | 12.5 | 12.5 | 12.5 | 16.7 | 40 | 26.7 | 10 | 10 | 10 | 13.4 | 13.4 | 18.75 | 21.25 |
| Cyclohexyl acrylate | | | | 16.6 | | 26.7 | | | 30 | 13.3 | 13.3 | | |
| Exposure, sec | 1.5 | 0.5 | 0.5 | 0.5 | 1.0 | 2.0 | 2.0 | 1.5 | 1.5 | 1.5 | 1.5 | 1.0 | 1.0 |

| Coating | a | b | c | d | e | f | g | h | i | j | k | l | m |
|---|---|---|---|---|---|---|---|---|---|---|---|---|
| Sward hardness, Glass=100 | 8 | 8 | 10 | 20 | 12 | 40 | 20 | 26 | 24 | 22 | 22 | 18 | 14 |
| Reverse impact, in. lbs | 165 | 165 | 165 | 325 | 165 | 50 | 165 | 165 | 125 | 125 | 50 | 100 | 50 |
| Acetone rubs, cycles | 38 | 37 | 49 | 49 | 50 | 50 | 34 | 50 | 26 | 50 | 45 | 50 | 50 |
| Water resistance, 30 min. at 100° C | (1) | (2) | (2) | (1) | (1) | (1) | (3) | (3) | (1) | (3) | (3) | (1) | (1) |
| Adhesion, cross-hatch, Scotch tape | (4) | 50% | (5) | 70% | 90% | (5) | (5) | (5) | 95 | (5) | (5) | 50% | 2% |

Resin A = A commercially available low molecular weight unsaturated polyester produced by the reaction of phthalic anhydride and maleic anhydride with propylene glycol.
Resin B = A commercially available 81/17 vinyl chloride/vinyl acetate polymer modified with maleic anyhdride.
Resin C = A commercially available high molecular weight methyl methacrylate polymer.
1 Good.
2 Fair.
3 Excellent
4 Fail.
5 Pass.

What is claimed is:

1. The method for polymerizing a polymerizable ethylenically unsaturated monomer containing at least one polymerizable ethylenically unsaturated group of the structure

which comprises exposing said monomer to high intensity predominantly continuum light radiation, said high intensity predominantly continuum light radiation having a source intensity of at least about 350 watts per square centimeter steradian when integrated throughout the entire spectral range of said continuum light radiation with a positive amount of up to 30 percent of the light radiated having wavelengths shorter than 4,000 Angstroms and at least 70 percent of the light radiated having wavelengths longer than 4,000 Angstroms.

2. The method of claim 1, wherein the source of said high intensity predominantly continuum light radiation is a swirl-flow plasma arc means.

3. The method of claim 2, wherein the gaseous medium in the swirl-flow plasma arc means is an inert rare gas.

4. The method for curing a curable organic polymer composition which comprises exposing said polymer to high intensity predominantly continuum light radiation, said high intensity predominantly continuum light radiation having a source intensity of at least 350 watts per square centimeter steradian when integrated throughout the entire spectral range of said continuum light radiation with a positive amount of up to 30 percent of the light radiated having wavelengths shorter than 4,000 Angstroms and at least 70 percent of the light radiated at a wavelength longer than 4,000 Angstroms.

5. The method of claim 4, wherein the source of said high intensity predominantly continuum light radiation is a swirl-flow plasma arc means.

6. The method of claim 5, wherein the gaseous medium in the swirl-flow plasma arc means is an inert rare gas.

7. The method of claim 5, wherein the polymer is an olefin polymer.

8. The method of claim 5, wherein the polymer is a siloxane polymer.

9. The method of claim 5, wherein the polymer is a vinyl polymer.

10. The method of claim 5, wherein the polymer is an acrylic polymer.

11. The method of claim 5, wherein the polymer is a urethane polymer.

12. The method of claim 5, wherein the polymer is a polyester.

13. The method of claim 5, wherein the polymer is a polyamide.

14. The method of claim 5, wherein the polymer is a norbornenyl polymer.

15. The method of claim 5, wherein a crosslinker, photosensitizer or free radical initiator is also present.

16. The method of claim 5, wherein the polymer is an ethylene polymer.

17. The method of claim 16, wherein the polymer is polyethylene.

18. The method of claim 5, wherein the organic polymer composition is a 100 percent solids coating composition comprising (A) a member from the group consisting of an organic polymer and (B) from about 5 to about 95 percent by weight of said composition of a member from the group of acrylyl and vinyl monomers.

19. The method of claim 5, wherein the organic polymer composition is a 100 percent solids coating composition comprising (A) a polyester containing in said polyester molecule in polymerized form the norbornenyl group:

wherein y has a value of from 0 to 5 and (B) from about 5 to about 95 percent by weight of said composition of an acrylyl ester of the formula:

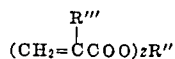

wherein R''' is hydrogen or methyl;
z is an integer having a value of from 1 to about 4;
and R'' is a member of the group of:
a. hydrogen,
b. alkyl of from one to about 18 carbon atoms,
c. alkoxyalkyl having up to about 15 carbon atoms,
d. haloalkyl having up to about 15 carbon atoms,
e. cyano,
f. cyanoalkyl wherein the alkyl group has up to about 15 carbon atoms,
g. epoxyalkyl wherein the alkyl group has up to about 15 carbon atoms,
h. aryl,
i. aryloxyalkyl wherein the alkyl group has up to about 15 carbon atoms,
j. trialkoxysiloxyalkyl wherein the alkoxy group has from one to about five carbon atoms and alkyl group has up to about 15 carbon atoms,
k. —CONR''''$_2$ wherein R'''' can be hydrogen or hydrocarbyl having up to about 15 carbon atoms,
l. dicyclopentenyl,
m. bicyclo[2.2.1]hept-2-en-5-yl,
n. bicyclo[2.2.1]hept-2-en-5-alkyl wherein the alkyl group has from one to about four carbon atoms,
o. divalent —$C_pH_{2p}$—wherein p has value of from 1 to about 10.
p. —$C_wH_{2w}(OC_wH_{2w})_v$ wherein w has a value of from 2 to about 4 and v has a value of from 1 to about 5,000,
q.

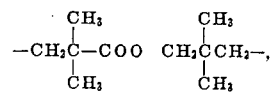

r. trivalent $C_qH_{2q-1}$ wherein q has a value of from 3 to about 10,
s. tetravalent $C_sH_{2s-2}$ wherein s has a value of from 4 to about 10, and
t. hydroxylalkyl having up to about 10 carbon atoms.

20. The method of claim 19, wherein the concentration of the acrylyl ester is from about 25 to about 55 weight percent.

21. The method of claim 19, wherein the polyester has the repeating unit

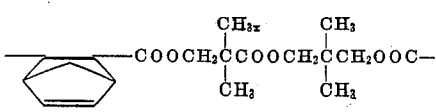

22. The method of claim 19, wherein the polyester has been modified by reaction with an organic isocyante.

23. The method of claim 22, wherein the organic isocyanate is bis(2-isocyanatoethyl) 5-norbornene-2,3-dicarboxylate.

24. The method of claim 18, wherein a crosslinker, photosensitizer or free radical initiator is also present.

25. The method of claim 15, wherein the photosensitizer is benzophenone and the free radical initiator is 2,4-dichlorobenzoyl peroxide.

26. The method of claim 15, wherein the organic polymer is a silicone polymer.

27. The method of claim 24, wherein the photosensitizer is selected from the group of benzophenone, benzil or 4-methoxybenzophenone.

28. In a method for producing an electrical conductor by extruding an ethylene polymer on the metal conductor and curing said polymer, the improvement of curing said polymer by the method claimed in claim 4.

29. The method of claim 28, wherein the polymer is polyethylene.

30. In a method for producing an improved fabric the steps of treating said fabric with at least one polymerizable ethylenically unsaturated monomer and then exposing said treated fabric to high intensity predominantly continuum light radiation, said high intensity predominantly continuum light radiation having a source intensity of at least about 350 watts per square centimeter steradian when integrated throughout the entire spectral range of said continuum light radiation with a positive amount of up to 30 percent of the light radiated having wavelengths shorter than 4,000 Angstroms and at least 70 percent of the light radiated at a wavelength longer than 4,000 Angstrom.

31. The method of claim 30, wherein the source of said high intensity predominantly continuum light radiation is a swirl-flow plasma arc means.

32. The method of claim 1, wherein the polymerization is carried out under an inert gas atmosphere.

33. The method of claim 4, wherein the curing is carried out under an inert gas atmosphere.

* * * * *